(12) United States Patent
Yamada

(10) Patent No.: US 11,330,482 B2
(45) Date of Patent: May 10, 2022

(54) USER EQUIPMENT, METHOD, AND BASE STATION

(71) Applicant: Sharp Kabushiki Kaisha, Sakai (JP)

(72) Inventor: Shohei Yamada, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 16/284,566

(22) Filed: Feb. 25, 2019

(65) Prior Publication Data

US 2019/0191345 A1 Jun. 20, 2019

Related U.S. Application Data

(63) Continuation of application No. 16/055,426, filed on Aug. 6, 2018, now Pat. No. 10,225,769, which is a continuation of application No. 15/918,772, filed on Mar. 12, 2018, now Pat. No. 10,057,821, which is a continuation of application No. 15/649,608, filed on Jul. 13, 2017, now Pat. No. 9,924,421, which is a continuation of application No. 14/168,954, filed on Jan. 30, 2014, now Pat. No. 9,713,044.

(51) Int. Cl.
*H04W 36/00* (2009.01)
*H04W 76/15* (2018.01)
*H04W 74/08* (2009.01)

(52) U.S. Cl.
CPC .... *H04W 36/0072* (2013.01); *H04W 36/0069* (2018.08); *H04W 74/0833* (2013.01); *H04W 76/15* (2018.02)

(58) Field of Classification Search
CPC ......... H04W 36/0072; H04W 36/0069; H04W 76/15; H04W 74/0833
See application file for complete search history.

(56) References Cited

U.S. PATENT DOCUMENTS

| | | | |
|---|---|---|---|
| 2010/0029280 A1 | 2/2010 | Tenny et al. | |
| 2010/0080116 A1 | 4/2010 | Agashe et al. | |
| 2010/0142485 A1* | 6/2010 | Lee | H04W 36/02 370/331 |
| 2010/0184438 A1 | 7/2010 | Wu | |

(Continued)

FOREIGN PATENT DOCUMENTS

| | | |
|---|---|---|
| CN | 102457970 | 5/2012 |
| WO | 2011111229 | 9/2011 |

OTHER PUBLICATIONS

Notice of Allowance issued for U.S. Appl. No. 16/055,426 dated Oct. 18, 2018.

(Continued)

*Primary Examiner* — Moustapha Diaby
(74) *Attorney, Agent, or Firm* — Austin Rapp

(57) ABSTRACT

A method for receiving a radio resource control (RRC) message by a user equipment (UE) is described. The method includes receiving, from a base station, an RRC connection reconfiguration message for adding a secondary cell group (SCG), wherein the RRC connection reconfiguration message includes data radio bearer (DRB) configuration parameters for remapping a DRB that is established on a master cell group (MCG), to the SCG; and remapping the DRB to the SCG based on the RRC connection reconfiguration message, wherein the DRB configuration parameters include a packet data convergence protocol (PDCP) configuration.

4 Claims, 16 Drawing Sheets

(56) References Cited

U.S. PATENT DOCUMENTS

| | | | |
|---|---|---|---|
| 2011/0194533 A1 | 8/2011 | Chen | |
| 2011/0300856 A1 | 12/2011 | Aminaka | |
| 2012/0040677 A1 | 2/2012 | Chen | |
| 2012/0142361 A1* | 6/2012 | Zhao | H04W 36/28 455/446 |
| 2012/0213089 A1 | 8/2012 | Shi et al. | |
| 2012/0250631 A1 | 10/2012 | Hakola et al. | |
| 2012/0282964 A1 | 11/2012 | Xiao et al. | |
| 2013/0003586 A1 | 1/2013 | Tajima et al. | |
| 2014/0003329 A1* | 1/2014 | Chen | H04W 4/60 370/315 |
| 2014/0177560 A1* | 6/2014 | Guo | H04W 52/365 370/329 |
| 2014/0192775 A1* | 7/2014 | Li | H04W 76/15 370/331 |
| 2014/0293896 A1 | 10/2014 | Kuo | |
| 2014/0307872 A1* | 10/2014 | Heo | H04L 5/22 380/270 |
| 2014/0335869 A1 | 11/2014 | Choi et al. | |
| 2014/0355562 A1* | 12/2014 | Gao | H04W 72/0426 370/331 |
| 2015/0049649 A1 | 2/2015 | Zhu et al. | |
| 2016/0050707 A1 | 2/2016 | Li et al. | |

OTHER PUBLICATIONS

ETRI, "Consideration on the RA result indication to the MeNB," 3GPP TSG-RAN WG2 Meeting #84, R2-133889, Nov. 15, 2013.

NTT Docomo, Inc., "TP to TR 36.842 on SeNB modification and release," 3GPP TSG-RAN WG2 #84, R2-134620, Nov. 15, 2013.

3GPP TS 36.300 V12.0.0, Evolved Universal Terrestrial Radio Access (E-UTRA) and Evolved Universal Terrestrial Radio Access Network (E-UTRAN); Overall description; Stage 2, (Release 12), Dec. 2013.

3GPP TR 36.932 V1.0.0, Scenarios and Requirements for Small Cell Enhancements for E-UTRA and E-UTRAN, (Release 12), Dec. 2012.

NTT Docomo, Inc, "New Study Item Description: Small Cell enhancements for E-UTRA and E-UTRAN Higher-layer Aspects," 3GPP TSG-RAN Meeting #58, RP-122033, Dec. 2012.

RAN WG2, "LS on Random Access in dual connectivity," R2-134603, Nov. 11, 2013.

ZTE Corporation, "Discussion on necessity of RACH procedure for reconfiguration synchronization," R2-140116, Jan. 10, 2014.

Samsung, "SCG user plane security in 1A," R2-140335, Feb. 10, 2014.

International Search Report issued for International Patent Application No. PCT/JP2015/000131 dated Mar. 17, 2015.

International Search Report issued for International Patent Application No. PCT/JP2015/000133 dated Mar. 24, 2015.

Office Action issued for U.S. Appl. No. 14/168,954 dated Feb. 18, 2015.

Office Action issued for U.S. Appl. No. 14/168,954 dated Jun. 4, 2015.

Office Action issued for U.S. Appl. No. 14/168,954 dated Oct. 2, 2015.

Office Action issued for U.S. Appl. No. 14/168,954 dated Apr. 6, 2016.

Advisory Action issued for U.S. Appl. No. 14/168,954 dated Jun. 24, 2016.

Office Action issued for U.S. Appl. No. 14/168,954 dated Aug. 19, 2016.

Notice of Allowance issued for U.S. Appl. No. 14/168,954 dated Mar. 16, 2017.

Alcatel-Lucent Shanghai Bell, "Signalling flows for dual connectivity architecture 1A", 3GPP TSG RAN WG3 Meeting #82, San Francisco, USA, R3-132168, Nov. 15, 2013.

Office Action issued for U.S. Appl. No. 15/649,608 dated Aug. 10, 2017.

Notice of Allowance issued for U.S. Appl. No. 15/649,608 dated Nov. 8, 2017.

Notice of Allowance issued for U.S. Appl. No. 15/918,772 dated Apr. 23, 2018.

Corrected Notice of Allowance issued for U.S. Appl. No. 16/055,426 dated Nov. 28, 2018.

Ericsson, "Signalling procedures for dual connectivity," 3GPP TSG-RAN WG2 #84, San Francisco, USA, R2-134219, Nov. 15, 2013.

Huawei, HiSilicon, "Discussion of one vs. separate MACs towards MeNB and SeNB," 3GPP TSG RAN WG2 Meeting #84, San Francisco, USA, R2-133977, Nov. 15, 2013.

* cited by examiner

USER EQUIPMENT, METHOD, AND BASE STATION

CROSS-REFERENCE TO RELATED APPLICATIONS

This application is a continuation of U.S. patent application Ser. No. 16/055,426, entitled "USER EQUIPMENT, METHOD, AND BASE STATION," filed on Aug. 6, 2018, which is a continuation of U.S. patent application Ser. No. 15/918,772, entitled "USER EQUIPMENT, METHOD, AND BASE STATION," filed on Mar. 12, 2018, and now issued as U.S. Pat. No. 10,057,821, which is a continuation of U.S. patent application Ser. No. 15/649,608, entitled "USER EQUIPMENT, METHOD, AND BASE STATION," filed on Jul. 13, 2017, and now issued as U.S. Pat. No. 9,924,421, which is a continuation of U.S. patent application Ser. No. 14/168,954, entitled "SYSTEMS AND METHODS FOR DUAL-CONNECTIVITY OPERATION," filed on Jan. 30, 2014, and now issued as U.S. Pat. No. 9,713,044, which are all hereby incorporated by reference in their entirety.

TECHNICAL FIELD

The present disclosure relates generally to communication systems. More specifically, the present disclosure relates to systems and methods for dual-connectivity operation.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and efficiency have been sought. However, improving communication capacity, speed, flexibility and efficiency may present certain problems.

For example, wireless communication devices may communicate with one or more devices using multiple connections. However, the multiple connections may only offer limited flexibility and efficiency. As illustrated by this discussion, systems and methods that improve communication flexibility and efficiency may be beneficial.

DETAILED DESCRIPTION

Figure 1:
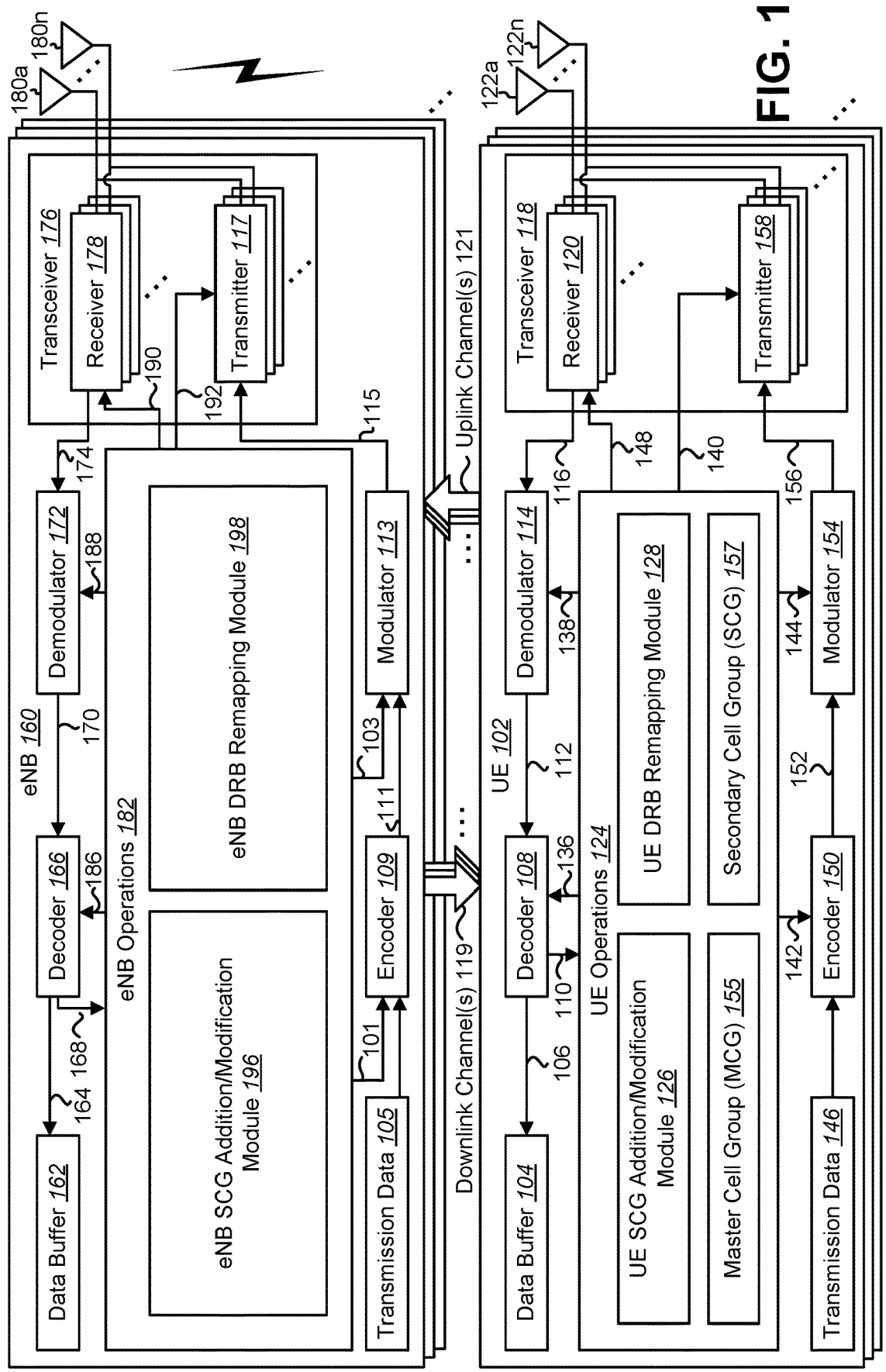
FIG. 1 is a block diagram illustrating one configuration of one or more evolved Node Bs (eNBs) and one or more user equipments (UEs) in which systems and methods for dual-connectivity operation may be implemented.

A method for receiving a radio resource control (RRC) message by a user equipment (UE) is described. The method includes receiving an RRC connection reconfiguration (RRCConnectionReconfiguration) message including secondary cell group (SCG) configuration parameters. The RRC connection reconfiguration message has a structure that the SCG configuration parameters do not include a data radio bearer (DRB) configuration.

The DRB configuration may include at least one of a packet data convergence protocol (PDCP) configuration, a radio link control (RLC) configuration, logical channel configuration, logical channel identity and evolved packet system (EPS) bearer identity.

The method may also include performing an RRC connection reconfiguration procedure in response to receiving the RRC connection reconfiguration message. The RRC connection reconfiguration procedure may include adding the SCG based on the SCG configuration parameters. The SCG may be added without radio bearer establishment on the SCG.

The RRC connection reconfiguration message may be received from a first evolved node B (eNB). In response to receipt of the RRC connection reconfiguration message including SCG configuration parameters, the method may include generating an RRC connection reconfiguration complete (RRCConnectionReconfigurationComplete) message including information related to a result of a random access procedure to a second eNB. The method may also include transmitting the RRC connection reconfiguration complete message to the first eNB.

If the random access procedure is successful, then the RRC connection reconfiguration complete message may include information related to the random access success on the SCG. If the random access procedure is not successfully completed after a time period, then the RRC connection reconfiguration complete message may include information related to the random access failure on the SCG.

A method for sending an RRC message by an eNB is also described. The method includes sending an RRC connection reconfiguration message including SCG configuration parameters. The RRC connection reconfiguration message has a structure that the SCG configuration parameters do not include a DRB configuration.

The DRB configuration may include at least one of a PDCP configuration, a RLC configuration, logical channel configuration, logical channel identity and EPS bearer identity.

The RRC connection reconfiguration message may be sent to a UE. The method may also include receiving an RRC connection reconfiguration complete message including information related to a result of a random access procedure by the UE to a second eNB.

If the random access procedure is successful, then the RRC connection reconfiguration complete message may include information related to the random access success on the SCG. If the random access procedure is not successfully completed after a time period, then the RRC connection reconfiguration complete message may include information related to the random access failure on the SCG.

A UE for receiving an RRC message is also described. The UE includes a processor and memory in electronic communication with the processor. Instructions stored in the memory are executable to receive an RRC connection reconfiguration message including SCG configuration parameters. The RRC connection reconfiguration message has a structure that the SCG configuration parameters do not include a DRB configuration.

An eNB for sending an RRC message is also described. The eNB includes a processor and memory in electronic communication with the processor. Instructions stored in the memory are executable to send an RRC connection reconfiguration message including SCG configuration parameters. The RRC connection reconfiguration message has a structure that the SCG configuration parameters do not include a DRB configuration.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe devices for dual-connectivity operation. This may be done in the context of an evolved universal terrestrial radio access network (E-UTRAN). For example, dual-connectivity operation between a user equipment (UE) and two or more eNBs on an E-UTRAN is described. In one configuration, the two or more eNBs may have different schedulers.

The systems and methods described herein may enhance the efficient use of radio resources in dual-connectivity operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single eNB is assumed to provide multiple serving cells for a UE. Even in scenarios where two or more cells may be aggregated (e.g., a macro cell aggregated with remote radio head (RRH) cells) the cells may be controlled (e.g., scheduled) by a single eNB.

However, in a small cell deployment scenario, each node (e.g., eNB, RRH, etc.) may have its own independent scheduler. To maximize the efficiency of radio resources utilization of both nodes, a UE may connect to two or more nodes that have different schedulers.

In one configuration, for a UE to connect to two nodes (e.g., eNBs) that have different schedulers, dual-connectivity between the UE and E-UTRAN may be utilized. For example, in addition to Rel-11 operation, a UE operating according to the Rel-12 standard may be configured with dual-connectivity (which may also be referred to as multi-connectivity, inter-eNB carrier aggregation, multi-flow, multi-cell cluster, multi-Uu, etc.). Because a maximum of two connections are currently considered, terminology of "dual-connectivity" may be used. The UE may connect to the E-UTRAN with multiple Uu interfaces, if configured. For instance, the UE may be configured to establish one or more additional radio interfaces by using one radio interface. Hereafter, one node is referred to as master eNB (MeNB) and another node is referred to as secondary eNB (SeNB).

In dual-connectivity, an RRC procedure for secondary cell group (SCG) addition or modification may be defined. Furthermore, to achieve an efficient data radio bearer (DRB) reconfiguration between a master cell group (MCG) and an SCG in dual-connectivity, efficient message exchange is needed.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more evolved Node Bs (eNBs) 160 and one or more user equipments (UEs) 102 in which systems and methods for dual-connectivity operation may be implemented. The one or more UEs 102 may communicate with one or more eNBs 160 using one or more antennas 122*a-n*. For example, a UE 102 transmits electromagnetic signals to the eNB 160 and receives electromagnetic signals from the eNB 160 using the one or more antennas 122*a-n*. The eNB 160 communicates with the UE 102 using one or more antennas 180*a-n*.

It should be noted that in some configurations, one or more of the UEs 102 described herein may be implemented in a single device. For example, multiple UEs 102 may be combined into a single device in some implementations. Additionally or alternatively, in some configurations, one or more of the eNBs 160 described herein may be implemented in a single device. For example, multiple eNBs 160 may be combined into a single device in some implementations. In the context of FIG. 1, for instance, a single device may include one or more UEs 102 in accordance with the systems and methods described herein. Additionally or alternatively, one or more eNBs 160 in accordance with the systems and methods described herein may be implemented as a single device or multiple devices.

The UE 102 and the eNB 160 may use one or more channels 119, 121 to communicate with each other. For example, a UE 102 may transmit information or data to the eNB 160 using one or more uplink channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more eNBs 160 may also transmit information or data to the one or more UEs 102 using one or more downlink channels 119 and signals, for instance. Examples of downlink channels 119 include a PDCCH, a PDSCH, etc. Examples of downlink signals include a primary synchronization signal (PSS), a cell-specific reference signal (CRS), and a channel state information (CSI) reference signal (CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UE SCG addition/modification module 126 and a UE DRB remapping module 128. In some implementations, the UE operations module 124 may include physical (PHY) entities, MAC entities, RLC entities, PDCP entities, and an RRC entity.

The UE operations module 124 may provide the benefit of utilizing the radio resources of an MCG 155 and an SCG 157 efficiently. When an SCG 157 is added, the two cell groups may be configured. One cell group is an MCG 155 and another is an SCG 157. An MCG 155 may provide a signaling radio bearer (SRB) to exchange an RRC message. An SCG 157 may be added via the MCG 155. The MCG 155 may provide a radio connection between the UE 102 and a master eNB (MeNB) 160. The SCG 157 may provide a radio connection between the UE 102 and a secondary eNB (SeNB) 160.

The UE SCG addition/modification module 126 may receive an RRC connection reconfiguration (also referred to as an RRCConnectionReconfiguration) message that includes SCG configuration parameters. In one implementation, the UE SCG addition/modification module 126 may receive the RRC connection reconfiguration message from a master eNB (MeNB) 160 for SCG 157 addition or modification. The MeNB 160 may trigger the UE SCG addition/modification module 126 to apply the new radio resource configuration of the SCG 157 by sending the RRC connection reconfiguration message to the UE 102.

The SCG configuration parameters may include all, some, or at least one of a carrier frequency for a cell in the SCG 157, a physical cell identity for the cell in the SCG 157, a radio resource config common (RadioResourceConfigCommon) information element for the SCG 157, newUE-Identity information for the SCG 157, a random access channel (RACH)-ConfigDedicated information element for the SCG 157, and a RadioResourceConfigDedicated information element for the SCG 157. The RadioResorceConfigCommon information element may include all, some, or at least one of a physical random access channel (PRACH) configuration, a PUSCH-ConfigCommon, a PDSCH-ConfigComon, and a PUCCH-ConfigCommon. The RadioResourceConfigDedicated information element may include all, some, or at least one of a DRB configuration (drb-ToAddModList), a MAC main configuration (mac-MainConfig) and a physical configuration dedicated (pyhsicalConfigDedicated).

The RRC connection reconfiguration message may have a structure in which SCG configuration parameters do not include a DRB configuration. A DRB may transport packets of an evolved packet system (EPS) bearer between the UE 102 and an eNB 160. A DRB that is established on the MeNB 160 may be associated with the SCG 157. It should be noted that a DRB configuration may include all, some, or at least one of a packet data convergence protocol (PDCP) configuration, radio link control (RLC) configuration, logical channel configuration, logical channel identity and/or EPS bearer identity. It should be noted that a DRB configuration may mean a DRB establishment, a DRB re-establishment, DRB setting up, a new DRB configuration and/or a DRB reconfiguration.

The UE SCG addition/modification module 126 may perform an RRC connection reconfiguration procedure in response to receiving the RRC connection reconfiguration message. The UE SCG addition/modification module 126 may start to apply the new radio resource configuration of the SCG 157. In other words, upon receipt of the RRC connection reconfiguration message, if the RRC connection reconfiguration message includes SCG configuration parameters for SCG 157 addition or modification, the UE SCG addition/modification module 126 may perform or continue an RRC connection reconfiguration procedure. It should be noted that receipt of the RRC connection reconfiguration message itself may be considered as a part of the RRC connection reconfiguration procedure.

The RRC connection reconfiguration procedure may include adding the SCG 157 based on the SCG configuration parameters, as described below in connection with FIG. 10. The RRC connection reconfiguration procedure may also include modifying an established SCG 157 based on the SCG configuration parameters, as described below in connection with FIG. 11.

It should be noted that because the SCG configuration parameters do not include a DRB configuration, the E-UTRAN may ensure that the establishment of radio bearers (RBs) is included only when the SCG 157 is added. Therefore, SCG 157 addition without RB establishment on the SCG 157 may be performed.

The UE SCG addition/modification module 126 may send an RRC connection reconfiguration complete message. The UE SCG addition/modification module 126 may send the RRC connection reconfiguration complete message to the MeNB 160. The RRC connection reconfiguration complete message may indicate to the MeNB 160 the completion of RRC connection reconfiguration by the UE 102. The RRC connection reconfiguration complete message may further indicate to the MeNB 160 and/or the SeNB 160 (e.g., through the MeNB 160) the completion of SCG 157 addition or modification by the UE 102. A part of the RRC connection reconfiguration complete message may be transferred from the MeNB 160 to the SeNB 160.

In one implementation, the UE SCG addition/modification module 126 may generate an RRC connection reconfiguration complete message that includes information related to a result of a random access procedure to a second eNB (e.g., the SeNB) 160. The UE SCG addition/modification module 126 may perform a random access procedure with the SeNB 160 as part of the RRC connection reconfiguration procedure. If the random access procedure is successful, then the RRC connection reconfiguration complete message may include information related to the random access success on the SCG 157. If the random access procedure is not successfully completed after a time period, then the RRC connection reconfiguration complete message may include information related to the random access failure on the SCG 157. The UE SCG addition/modification module 126 may transmit the RRC connection reconfiguration complete message to a first eNB (e.g., the MeNB) 160.

The UE DRB remapping module 128 may remap a DRB that is established on the MCG 155 to the SCG 157. As described above, the RRC connection reconfiguration message may include SCG configuration parameters for SCG 157 modification. In one implementation, the SCG configuration parameters for SCG 157 modification may include a DRB configuration. The DRB configuration may include DRB configuration parameters for remapping a DRB that is established on the MCG 155 to the SCG 157. The DRB configuration parameters may include all, some, or at least one of a PDCP configuration, RLC configuration, logical channel configuration, logical channel identity and/or EPS bearer identity.

Upon receiving the RRC connection reconfiguration message, the UE DRB remapping module 128 may apply the new configuration (i.e., upon receiving the RRC connection reconfiguration message, the UE DRB remapping module 128 may start an RRC connection reconfiguration procedure). In one implementation, upon receipt of the RRC connection reconfiguration message, if the RRC connection reconfiguration message includes SCG configuration parameters for SCG 157 modification, the UE 102 may perform or continue an RRC connection reconfiguration procedure.

The UE DRB remapping module 128 may remap a PDCP that is established on the MCG 155 to the SCG 157. For a DRB that is established on the MCG 155, the UE DRB remapping module 128 may associate (e.g., remap) the PDCP to the SCG 157. The UE DRB remapping module 128 may then re-establish the PDCP on the SCG 157.

The UE DRB remapping module 128 may remap an RLC that is established on the MCG 155 to the SCG 157. For a DRB that is established on the MCG 155, the UE DRB remapping module 128 may associate the RLC to the SCG 157. The UE DRB remapping module 128 may then re-establish the RLC on the SCG 157. By performing PDCP re-establishment and RLC re-establishment, the UE 102 may resume the DRB on the SCG 157.

The UE operations module 124 may provide information 148 to the one or more receivers 120. For example, the UE operations module 124 may inform the receiver(s) 120 when or when not to receive transmissions based on the RRC connection reconfiguration message.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include the RRC reconfiguration complete message on the MCG 155.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, one or more data buffers 162 and one or more eNB operations modules 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PUSCH transmission data) that may be used by the eNB operations module 182 to perform one or more operations.

In general, the eNB operations module 182 may enable the eNB 160 to communicate with the one or more UEs 102. The eNB operations module 182 may include one or more of an eNB SCG addition/modification module 196 and an eNB DRB remapping module 198. The eNB operations module 182 may provide the benefit of utilizing the radio resources of the MCG 155 and the SCG 157 efficiently. The eNB operations module 182 may include PHY entities, MAC entities, RLC entities, PDCP entities, and an RRC entity.

The eNB SCG addition/modification module 196 may send an RRC connection reconfiguration message to the UE 102. The RRC connection reconfiguration message may be sent as part of an RRC connection reconfiguration procedure. The RRC connection reconfiguration procedure may be performed to add or modify an SCG 157.

The RRC connection reconfiguration message may include secondary cell group (SCG) configuration parameters. The SCG configuration parameters may include information associated with a new radio resource configuration of an SCG 157.

The RRC connection reconfiguration message may have a structure in which SCG configuration parameters do not include a DRB configuration. Because the SCG configuration parameters do not include a DRB configuration, the E-UTRAN may ensure that the establishment of radio bearers (RBs) is included only when the SCG 157 is added. Therefore, SCG 157 addition without RB establishment on the SCG 157 may be performed.

The eNB SCG addition/modification module 196 may receive an RRC connection reconfiguration complete message. The RRC connection reconfiguration complete message may indicate to the eNB 160 the completion of RRC connection reconfiguration by the UE 102. The RRC connection reconfiguration complete message may further indicate to the eNB 160 the completion of SCG 157 addition or modification by the UE 102.

In one implementation, the UE 102 may generate an RRC connection reconfiguration complete message that includes information related to a result of a random access procedure to a second eNB (e.g., the SeNB) 160. The UE 102 may perform a random access procedure with the SeNB 160 as part of the RRC connection reconfiguration procedure. If the random access procedure is successful, then the RRC connection reconfiguration complete message may include information related to the random access success on the SCG 157. If the random access procedure is not successfully completed after a time period, then the RRC connection reconfiguration complete message may include information related to the random access failure on the SCG 157.

The eNB DRB remapping module 198 may generate an RRC connection reconfiguration message that is sent to the UE 102. The eNB DRB remapping module 198 may trigger the UE 102 to apply a new radio resource configuration of an SCG 157 by sending the RRC connection reconfiguration message to the UE 102.

The RRC connection reconfiguration message generated by the eNB DRB remapping module 198 may include SCG configuration parameters for SCG 157 modification. For example, the SCG configuration parameters for SCG 157 modification may include a DRB configuration. The DRB configuration may include DRB configuration parameters for remapping a DRB that is established on an MCG 155 to the SCG 157.

The eNB DRB remapping module 198 may cause a PDCP that is established on the MCG 155 to be remapped to the SCG 157. For example, upon receiving the RRC connection reconfiguration message from the eNB 160, the UE 102 may remap a PDCP that is established on the MCG 155 to the SCG 157. The eNB DRB remapping module 198 may also cause the PDCP to be re-established on the SCG 157. For example, upon remapping the PDCP to the SCG 157, the UE 102 may then re-establish the PDCP on the SCG 157.

The eNB DRB remapping module 198 may cause an RLC that is established on the MCG 155 to be remapped to the SCG 157. For example, upon receiving the RRC connection reconfiguration message from the eNB 160, the UE 102 may remap an RLC that is established on the MCG 155 to the SCG 157. The eNB DRB remapping module 198 may also cause the RLC to be re-established on the SCG 157. For example, upon remapping the RLC to the SCG 157, the UE 102 may then re-establish the RLC on the SCG 157.

The eNB operations module 182 may provide information 190 to the one or more receivers 178. For example, the eNB operations module 182 may inform the receiver(s) 178 when or when not to receive transmissions based on the RRC messages.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

In general, the eNB operations module 182 may enable the eNB 160 to communicate with one or more network nodes (e.g., a mobility management entity (MME), serving gateway (S-GW), eNBs). The eNB operations module 182 may also generate a RRC connection reconfiguration message to be signaled to the UE 102. The RRC connection reconfiguration message may or may not include SCG configuration parameters for SCG 157 addition modification. The eNB operations module 182 may send, to the other eNB 160, the RRC connection reconfiguration message to be signaled to the UE 102. For example, the other eNB 160 may receive the SCG configuration parameters for SCG 157 addition or modification from the eNB 160 as a container. The eNB 160 may generate a RRC connection reconfiguration message that may include the received container and may send the RRC connection reconfiguration message to the UE 102. The eNB 160 may just send a RRC connection reconfiguration message included in the received container.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
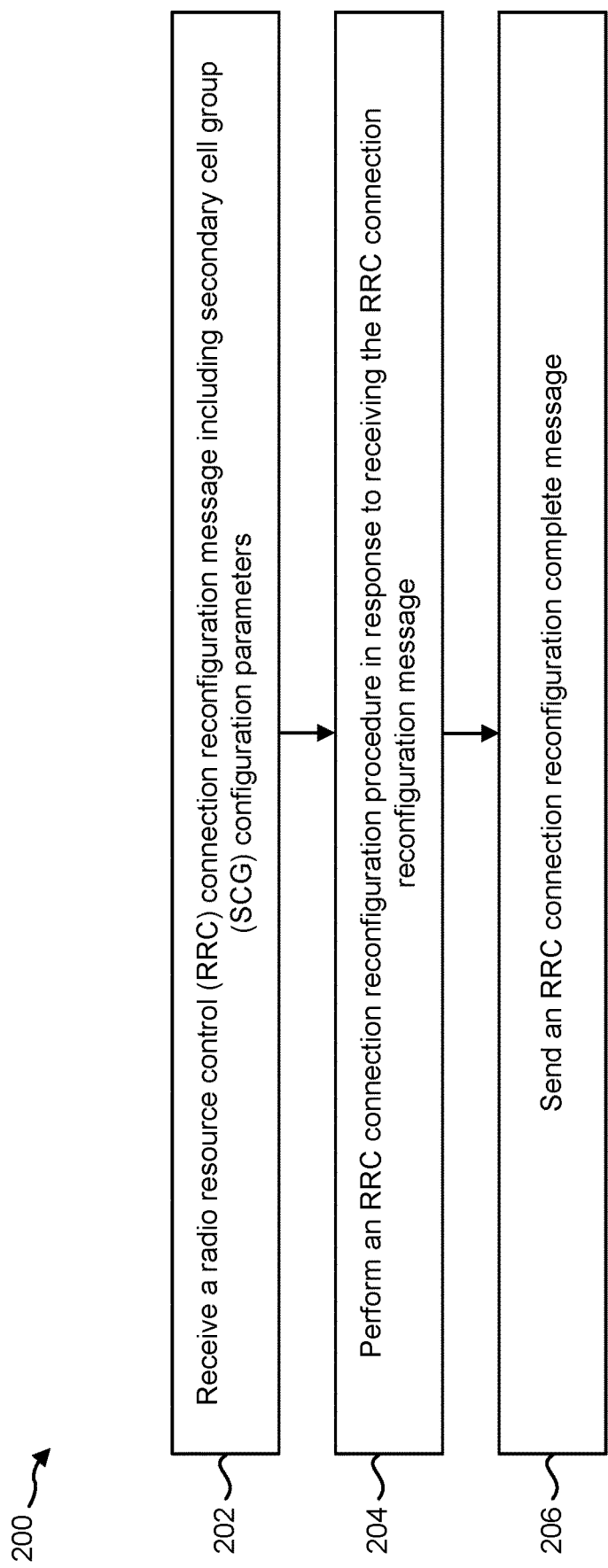
FIG. 2 is a flow diagram illustrating one implementation of a method for receiving a radio resource control (RRC) message by a UE.

FIG. 2 is a flow diagram illustrating one implementation of a method 200 for receiving an RRC message by a UE 102. In dual-connectivity, an RRC procedure for SCG 157 addition and modification may be defined. To achieve efficient DRB reconfiguration between an MCG 155 and an SCG 157, efficient message exchange is needed. An RRC connection reconfiguration procedure may be used to modify an RRC connection. For example, an RRC connection reconfiguration procedure may be used to establish, modify or release radio bearers (RBs); to perform handover; to setup, modify or release measurements; to add, modify, or release secondary cells (SCells); and to add, modify, or release an SCG 157. As part of the RRC connection reconfiguration procedure, non-access stratum (NAS) dedicated information may be transferred from the E-UTRAN to the UE 102.

The UE 102 may receive 202 an RRC connection reconfiguration (RRCConnectionReconfiguration) message that includes SCG configuration parameters. The RRC connection reconfiguration message may be received 202 from an eNB 160. In one implementation, the UE 102 may receive 202 the RRC connection reconfiguration message from a master eNB (MeNB) 160 for SCG 157 addition or modification. The SCG 157 addition or modification procedure may include adding or modifying radio resources associated with a secondary eNB (SeNB) 160. The MeNB 160 may trigger the UE 102 to apply the new radio resource configuration of the SCG 157 by sending the RRC connection reconfiguration message to the UE 102.

The RRC connection reconfiguration message may or may not include a DRB configuration. In one implementation, the RRC connection reconfiguration message may have a structure in which SCG configuration parameters do not include a DRB configuration. In another implementation, the RRC connection reconfiguration message may have a structure in which SCG configuration parameters does include a DRB configuration.

A DRB may transport packets of an EPS bearer between the UE 102 and an eNB 160. A DRB that is established on the MeNB 160 may be associated with the SCG 157. It should be noted that a DRB configuration may include all, some, or at least one of a PDCP configuration, RLC configuration, logical channel configuration, logical channel identity and/or EPS bearer identity. It should be noted that a DRB configuration may mean a DRB establishment, a DRB re-establishment, DRB setting up, a new DRB configuration and/or a DRB reconfiguration.

The UE 102 may perform 204 an RRC connection reconfiguration procedure in response to receiving the RRC connection reconfiguration message. The UE 102 may start to apply the new radio resource configuration of the SCG 157. In other words, upon receipt of the RRC connection reconfiguration message, if the RRC connection reconfiguration message includes SCG configuration parameters for SCG 157 addition or modification, the UE 102 may perform or continue an RRC connection reconfiguration procedure.

The RRC connection reconfiguration procedure may include adding the SCG 157 based on the SCG configuration parameters. This may be accomplished as described below in connection with FIG. 10. The RRC connection reconfiguration procedure may also include modifying an established SCG 157 based on the SCG configuration parameters. This may be accomplished as described below in connection with FIG. 11.

It should be noted that because the SCG configuration parameters may not include a DRB configuration, the E-UTRAN may ensure that the establishment of radio bearers (RBs) is included only when the SCG 157 is added. Therefore, SCG 157 addition without RB establishment on the SCG 157 may be performed.

The UE 102 may send 206 an RRC connection reconfiguration complete message. For example, the UE 102 may send 206 the RRC connection reconfiguration complete message to the MeNB 160. The RRC connection reconfiguration complete message may indicate to the MeNB 160 the completion of RRC connection reconfiguration by the UE 102. The RRC connection reconfiguration complete message may further indicate to the MeNB 160 and/or the SeNB 160 (e.g., through the MeNB 160) the completion of SCG 157 addition or modification by the UE 102.

In one implementation, the UE 102 may generate an RRC connection reconfiguration complete message that includes information related to a result of a random access procedure to a second eNB (e.g., the SeNB) 160. The UE 102 may perform a random access procedure with the SeNB 160 as part of the RRC connection reconfiguration procedure. If the random access procedure is successful, then the RRC connection reconfiguration complete message may include information related to the random access success on the SCG 157. If the random access procedure is not successfully completed after a time period, then the RRC connection reconfiguration complete message may include information related to the random access failure on the SCG 157. The UE 102 may transmit the RRC connection reconfiguration complete message to a first eNB (e.g., MeNB) 160.

Figure 3:
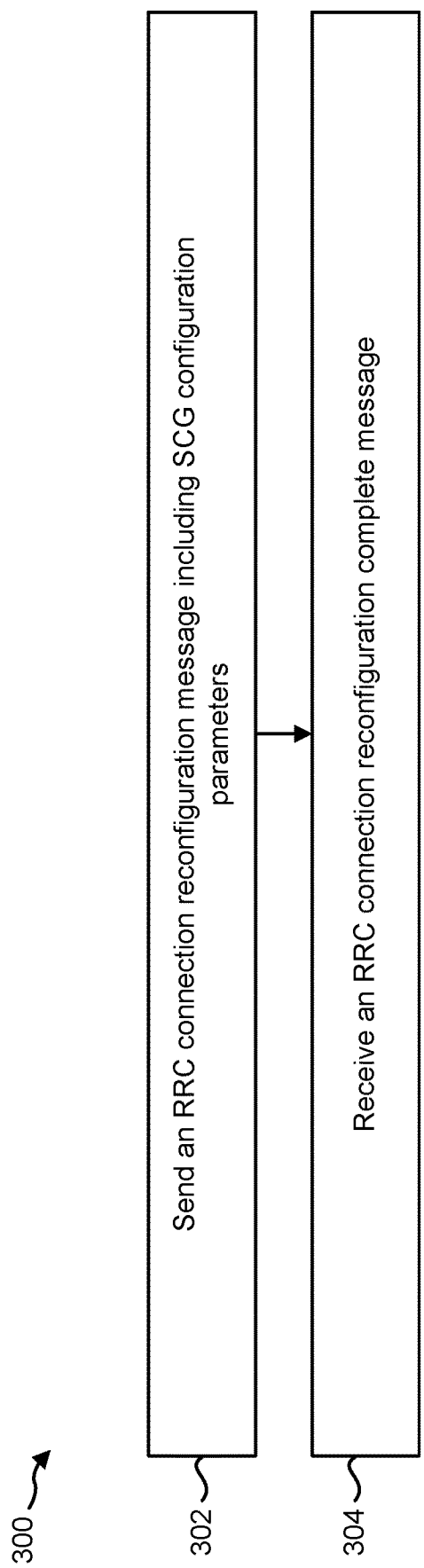
FIG. 3 is a flow diagram illustrating one implementation of a method for sending an RRC message by an eNB.

FIG. 3 is a flow diagram illustrating one implementation of a method 300 for sending an RRC message by an eNB 160. The RRC message may be part of dual-connectivity operation. In particular, the RRC message may be an RRC connection reconfiguration (RRCConnectionReconfiguration) message that is part of an RRC connection reconfiguration procedure. The eNB 160 may be an MeNB 160. The RRC connection reconfiguration procedure may be performed to add or modify an SCG 157. The SCG 157 addition or modification procedure may include adding or modifying radio resources associated with an SeNB 160.

The eNB 160 may send 302 the RRC connection reconfiguration message. The eNB 160 may send 302 the RRC connection reconfiguration message to a UE 102.

The RRC connection reconfiguration message may include SCG configuration parameters. The SCG configuration parameters may include information associated with a new radio resource configuration of the SCG 157.

The RRC connection reconfiguration message may have a structure in which SCG configuration parameters do not include a DRB configuration. Because the SCG configuration parameters do not include a DRB configuration, the E-UTRAN may ensure that the establishment of radio bearers (RBs) is included only when the SCG 157 is added. Therefore, SCG 157 addition without RB establishment on the SCG 157 may be performed.

The eNB 160 may receive 304 an RRC connection reconfiguration complete message. The RRC connection reconfiguration complete message may indicate to the MeNB 160 the completion of RRC connection reconfiguration by the UE 102. The RRC connection reconfiguration complete message may further indicate to the MeNB 160 and/or the SeNB 160 (e.g., through the MeNB 160) the completion of SCG 157 addition or modification by the UE 102.

In one implementation, the UE 102 may generate an RRC connection reconfiguration complete message that includes information related to a result of a random access procedure to a second eNB (e.g., the SeNB) 160. The UE 102 may perform a random access procedure with the SeNB 160 as part of the RRC connection reconfiguration procedure. If the random access procedure is successful, then the RRC connection reconfiguration complete message may include information related to the random access success on the SCG 157. If the random access procedure is not successfully completed after a time period, then the RRC connection reconfiguration complete message may include information related to the random access failure on the SCG 157. The UE 102 may transmit the RRC connection reconfiguration complete message to the first eNB (e.g., the MeNB) 160.

Figure 4:
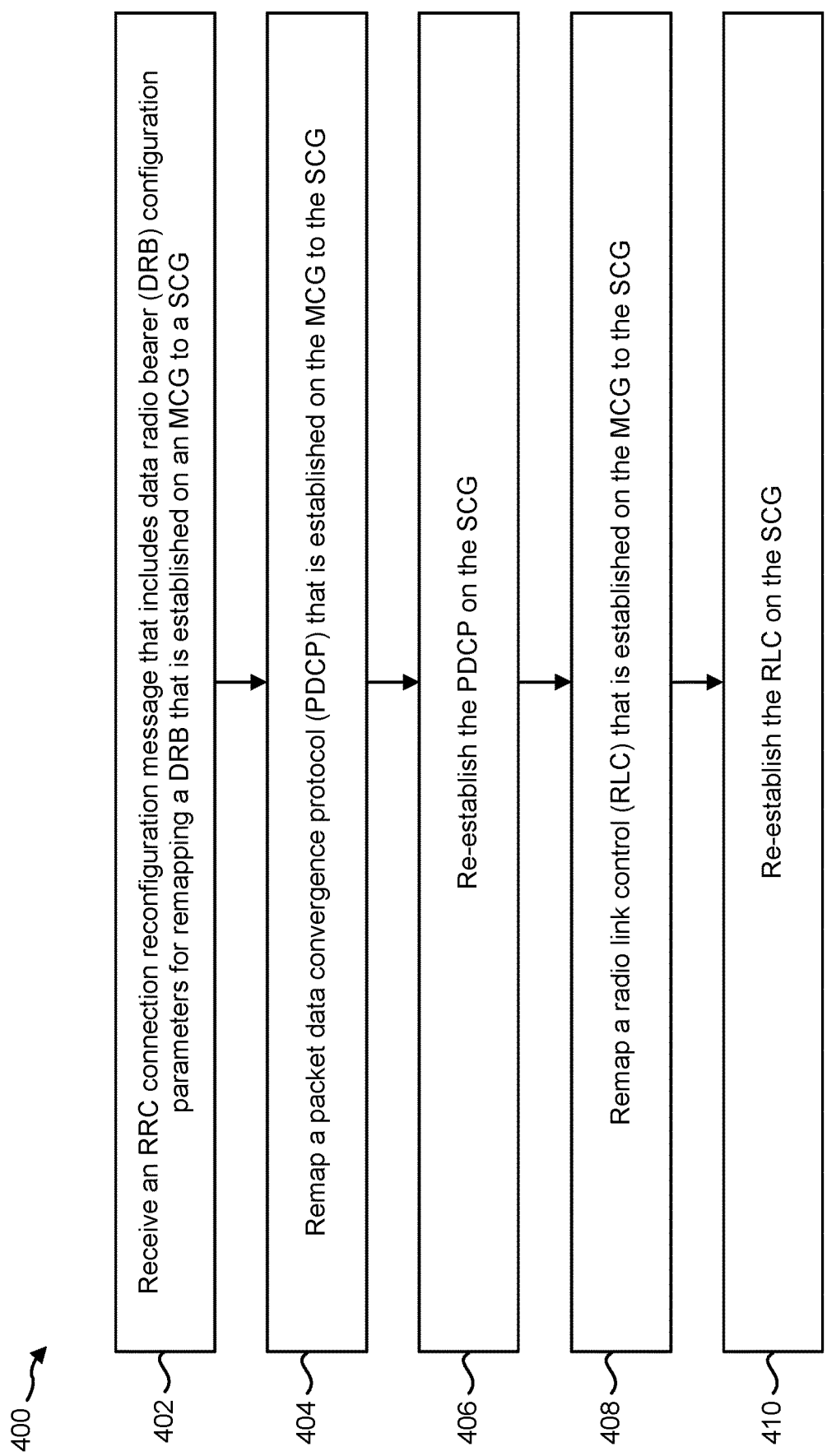
FIG. 4 is a flow diagram illustrating another implementation of a method for receiving an RRC message by a UE.

FIG. 4 is a flow diagram illustrating another implementation of a method 400 for receiving an RRC message by a UE 102. The method 400 may be performed as part of an SeNB modification procedure (also referred to as an SCG modification procedure).

The UE 102 may receive 402 an RRC connection reconfiguration (RRCConnectionReconfiguration) message from an eNB 160. An MeNB 160 may trigger the UE 102 to apply a new radio resource configuration of an SCG 157 by sending the RRC connection reconfiguration message to the UE 102.

The RRC connection reconfiguration message may include SCG configuration parameters for SCG 157 modification. In other words, The RRC connection reconfiguration message may have a structure to switch between a case that SCG configuration parameters include a DRB configuration and a case that SCG configuration parameters do not include a DRB configuration. For example, the SCG configuration parameters for SCG 157 modification may include a DRB configuration. The DRB configuration may include DRB configuration parameters for remapping a DRB that is established on an MCG 155 to the SCG 157. The DRB configuration parameters may include all, some, or at least one of a PDCP configuration, RLC configuration, logical channel configuration, logical channel identity and/or EPS bearer identity.

Upon receiving 402 the RRC connection reconfiguration message, the UE 102 may apply the new configuration (i.e., upon receiving the RRC connection reconfiguration message, the UE 102 may start an RRC connection reconfiguration procedure). In other words, upon receipt of the RRC connection reconfiguration message, if the RRC connection reconfiguration message includes SCG configuration parameters for SCG 157 modification, the UE 102 may perform or continue an RRC connection reconfiguration procedure.

The UE 102 may remap 404 a PDCP that is established on the MCG 155 to the SCG 157. For a DRB that is established on the MCG 155, the UE 102 may associate (e.g., remap) the PDCP to the SCG 157. The UE 102 may then re-establish 406 the PDCP on the SCG 157.

The UE 102 may remap 408 an RLC that is established on the MCG 155 to the SCG 157. For a DRB that is established on the MCG 155, the UE 102 may associate the RLC to the SCG 157. The UE 102 may then re-establish 410 the RLC on the SCG 157. By performing PDCP re-establishment and RLC re-establishment, the UE 102 may resume the DRB on the SCG 157.

Figure 5:
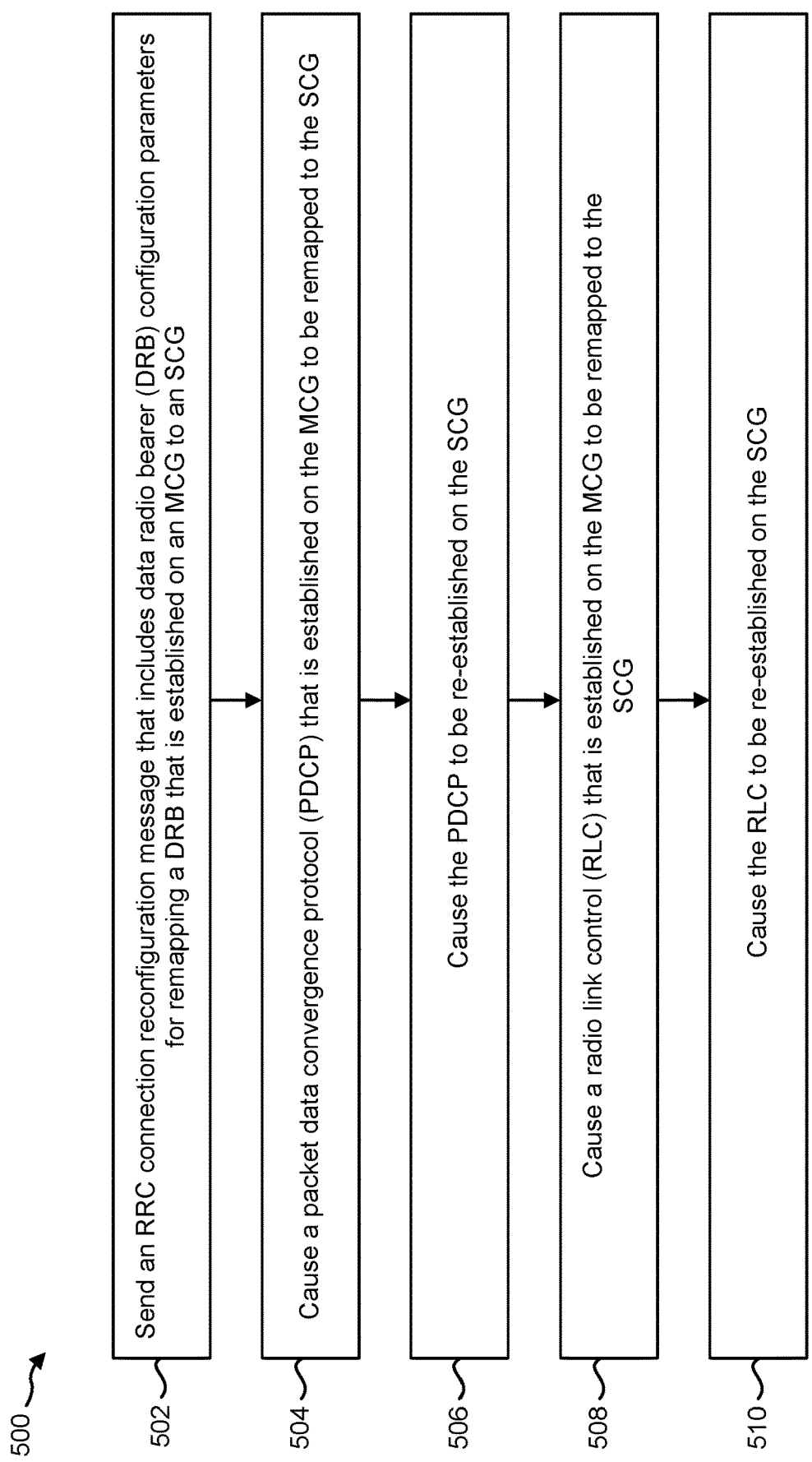
FIG. 5 is a flow diagram illustrating another implementation of a method for sending an RRC message by an eNB

FIG. 5 is a flow diagram illustrating another implementation of a method 500 for sending an RRC message by an eNB 160. The method 500 may be performed as part of an SeNB modification procedure (also referred to as an SCG modification procedure).

The eNB 160 may send 502 an RRC connection reconfiguration message to a UE 102. In one implementation, the eNB 160 may be an MeNB 160. The eNB 160 may trigger the UE 102 to apply a new radio resource configuration of an SCG 157 by sending 502 the RRC connection reconfiguration message to the UE 102.

The RRC connection reconfiguration message may include SCG configuration parameters for SCG 157 modification. In other words, The RRC connection reconfiguration message may have a structure to switch between a case that SCG configuration parameters include a DRB configuration and a case that SCG configuration parameters do not include a DRB configuration. For example, the SCG configuration parameters for SCG 157 modification may include a DRB configuration. The DRB configuration may include DRB configuration parameters for remapping a DRB that is established on an MCG 155 to the SCG 157. The DRB configuration parameters may include all, some, or at least one of a PDCP configuration, RLC configuration, logical channel configuration, logical channel identity and/or EPS bearer identity.

Upon receiving the RRC connection reconfiguration message, the UE 102 may apply the new configuration (i.e., upon receiving the RRC connection reconfiguration message, the UE 102 may start an RRC connection reconfiguration procedure). In other words, upon receipt of the RRC connection reconfiguration message, if the RRC connection reconfiguration message includes SCG configuration parameters for SCG 157 modification, the UE 102 may perform or continue an RRC connection reconfiguration procedure.

The eNB 160 may cause 504 a PDCP that is established on the MCG 155 to be remapped to the SCG 157. Upon receiving the RRC connection reconfiguration message from the eNB 160, the UE 102 may remap a PDCP that is established on the MCG 155 to the SCG 157. For a DRB that is established on the MCG 155, the UE 102 may associate (e.g., remap) the PDCP to the SCG 157.

The eNB 160 may cause 506 the PDCP to be re-established on the SCG 157. For example, upon remapping the PDCP to the SCG 157, the UE 102 may then re-establish the PDCP on the SCG 157.

The eNB 160 may cause 508 an RLC that is established on the MCG 155 to be remapped to the SCG 157. Upon receiving the RRC connection reconfiguration message from the eNB 160, the UE 102 may remap an RLC that is established on the MCG 155 to the SCG 157. For a DRB that is established on the MCG 155, the UE 102 may associate the RLC to the SCG 157.

The eNB 160 may cause 510 the RLC to be re-established on the SCG 157. For example, upon remapping the RLC to the SCG 157, the UE 102 may then re-establish the RLC on the SCG 157.

Figure 6:
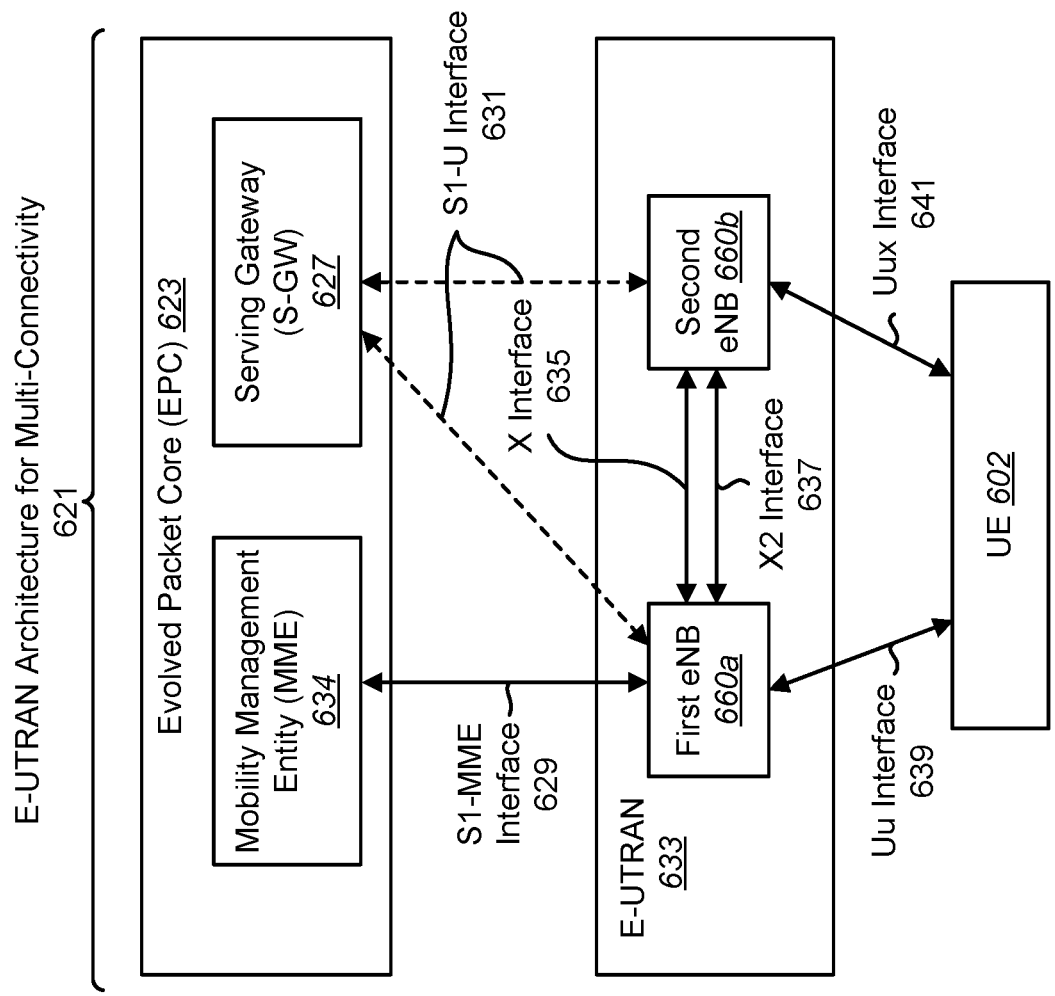
FIG. 6 is a block diagram illustrating configurations of Evolved Universal Terrestrial Radio Access Network (E-UTRAN) architecture in which systems and methods for dual-connectivity operation may be implemented.

FIG. 6 is a block diagram illustrating configurations of E-UTRAN architecture 621 in which systems and methods for dual-connectivity operation may be implemented. The UE 602 described in connection with FIG. 6 may be implemented in accordance with the UE 102 described in connection with FIG. 1. The eNBs 660a-b described in connection with FIG. 6 may be implemented in accordance with the eNB 160 described in connection with FIG. 1.

The E-UTRAN architecture for multi-connectivity 621 is one example of E-UTRAN architecture that may provide dual-connectivity for a UE 602. In this configuration, the UE 602 may connect to E-UTRAN 633 via a Uu interface 639 and a Uux interface 641. The E-UTRAN 633 may include a first eNB 660a and a second eNB 660b. The eNBs 660a-b may provide the E-UTRA user plane (PDCP/RLC/MAC/PHY) and control plane (RRC) protocol terminations toward the UE 602. The eNBs 660a-b may be interconnected with each other by an X2 interface 637. The S1 interface 629, 631 may support a many-to-many relation between MMEs 634, serving gateways 627 and eNBs 660a-b. The first eNB (e.g., MeNB) 660a and the second eNB (e.g., SeNB) 660b may also be interconnected with each other by means of one or more X interfaces 635, which may or may not be the same as the S1-MME 629 and/or X2 interface 637.

The eNBs 660 may host a variety of functions. For example, the eNBs 660 may host functions for radio resource management (e.g., radio bearer control, radio admission control, connection mobility control, dynamic allocation of resources to UEs 602 in both uplink and downlink (scheduling)). The eNBs 660 may also perform IP header compression and encryption of user data stream; selection of an MME 634 at UE 602 attachment when no routing to an MME 634 can be determined from the information provided by the UE 602; and routing of user plane data toward the serving gateway 627. The eNBs 660 may additionally perform scheduling and transmission of paging messages (originated from the MME 634); scheduling and transmission of broadcast information (originated from the MME or operation and maintenance (O&M)); measurement and measurement reporting configuration for mobility and scheduling; and scheduling and transmission of the public warning system (PWS) (which may include the earthquake and tsunami warning system (ETWS) and commercial mobile alert system (CMAS)) messages (originated from the MME 634). The eNBs 660 may further perform closed subscriber group (CSG) handling and transport level packet marking in the uplink.

The MME 634 may host a variety of functions. For example, the MME 634 may perform Non-Access Stratum (NAS) signaling; NAS signaling security; access stratum (AS) security control; inter core network (CN) node signaling for mobility between 3GPP access networks; and idle mode UE Reachability (including control and execution of paging retransmission). The MME 634 may also perform tracking area list management (for a UE 602 in idle and active mode); packet data network gateway (PDN GW) and S-GW selection; MME 634 selection for handovers with MME 634 change; and Serving GPRS Support Node (SGSN) selection for handovers to 2G or 3G 3GPP access networks. The MME 634 may additionally host roaming, authentication, and bearer management functions (including dedicated bearer establishment). The MME 634 may provide support for PWS (which includes ETWS and CMAS) message transmission, and may optionally perform paging optimization.

The S-GW 627 may also host the following functions. The S-GW 627 may host the local mobility anchor point for inter-eNB 660 handover. The S-GW 627 may perform mobility anchoring for inter-3GPP mobility; E-UTRAN idle mode downlink packet buffering and initiation of network triggered service request procedure; lawful interception; and packet routing and forwarding. The S-GW 627 may also perform transport level packet marking in the uplink and the downlink; accounting on user and QoS Class Identifier (QCI) granularity for inter-operator charging; and uplink (UL) and downlink (DL) charging per UE 602, packet data network (PDN), and QCI.

The radio protocol architecture of E-UTRAN 633 may include the user plane and the control plane. The user plane protocol stack may include PDCP, RLC, MAC and PHY sublayers. The PDCP, RLC, MAC and PHY sublayers (terminated at the eNB 660*a* on the network) may perform functions (e.g., header compression, ciphering, scheduling, ARQ and HARQ) for the user plane. PDCP entities are located in the PDCP sublayer. RLC entities are located in the RLC sublayer. MAC entities are located in the MAC sublayer. The PHY entities are located in the PHY sublayer.

The control plane may include a control plane protocol stack. The PDCP sublayer (terminated in eNB 660*a* on the network side) may perform functions (e.g., ciphering and integrity protection) for the control plane. The RLC and MAC sublayers (terminated in eNB on the network side) may perform the same functions as for the user plane. The RRC (terminated in eNB 660*a* on the network side) may perform the following functions. The RRC may perform broadcast functions, paging, RRC connection management, radio bearer (RB) control, mobility functions, UE 602 measurement reporting and control. The NAS control protocol (terminated in MME 634 on the network side) may perform, among other things, evolved packet system (EPS) bearer management, authentication, evolved packet system connection management (ECM)-IDLE mobility handling, paging origination in ECM-IDLE and security control.

The first eNB 660*a* and the second eNB 660*b* may be connected by the S1 interface 629, 631 to the EPC 623. The first eNB 660*a* may be connected to the MME 634 by the S1-MME interface 629. In one configuration, the second eNB 660*b* may be connected to the serving gateway 627 by the S1-U interface 631 (as indicated by a dashed line). The first eNB 660*a* may behave as the MME 634 for the second eNB 660*b* so that S1-MME interface 629 for the second eNB 660*b* may be connected (via the X interface 635, for instance) between the first eNB 660*a* and the second eNB 660*b*. Therefore, the first eNB 660*a* may appear to the second eNB 660*b* as an MME 634 (based on the S1-MME interface 629) and an eNB 660 (based on the X2 interface 637).

In another configuration, first eNB 660*a* may also be connected to the serving gateway 627 by the S 1-U interface 631 (as indicated by a dashed line). Therefore, the second eNB 660*b* may not be connected to the EPC 623. The first eNB 660*a* may appear to the second eNB 660*b* as an MME 634 (based on the S1-MME interface 629), an eNB (based on the X2 interface 637), and an S-GW 627 (based on the S1-U interface 631). This architecture 621 may provide a single node S1 interface 629, 631 (e.g., connection) with the EPC 623 for the first eNB 660*a* and the second eNB 660*b*. By the single node connection with EPC 623, MME 634 S-GW 627, a change (e.g., handover) could be mitigated as long as the UE 602 is in the coverage of the first eNB 660*a*.

Figure 7:
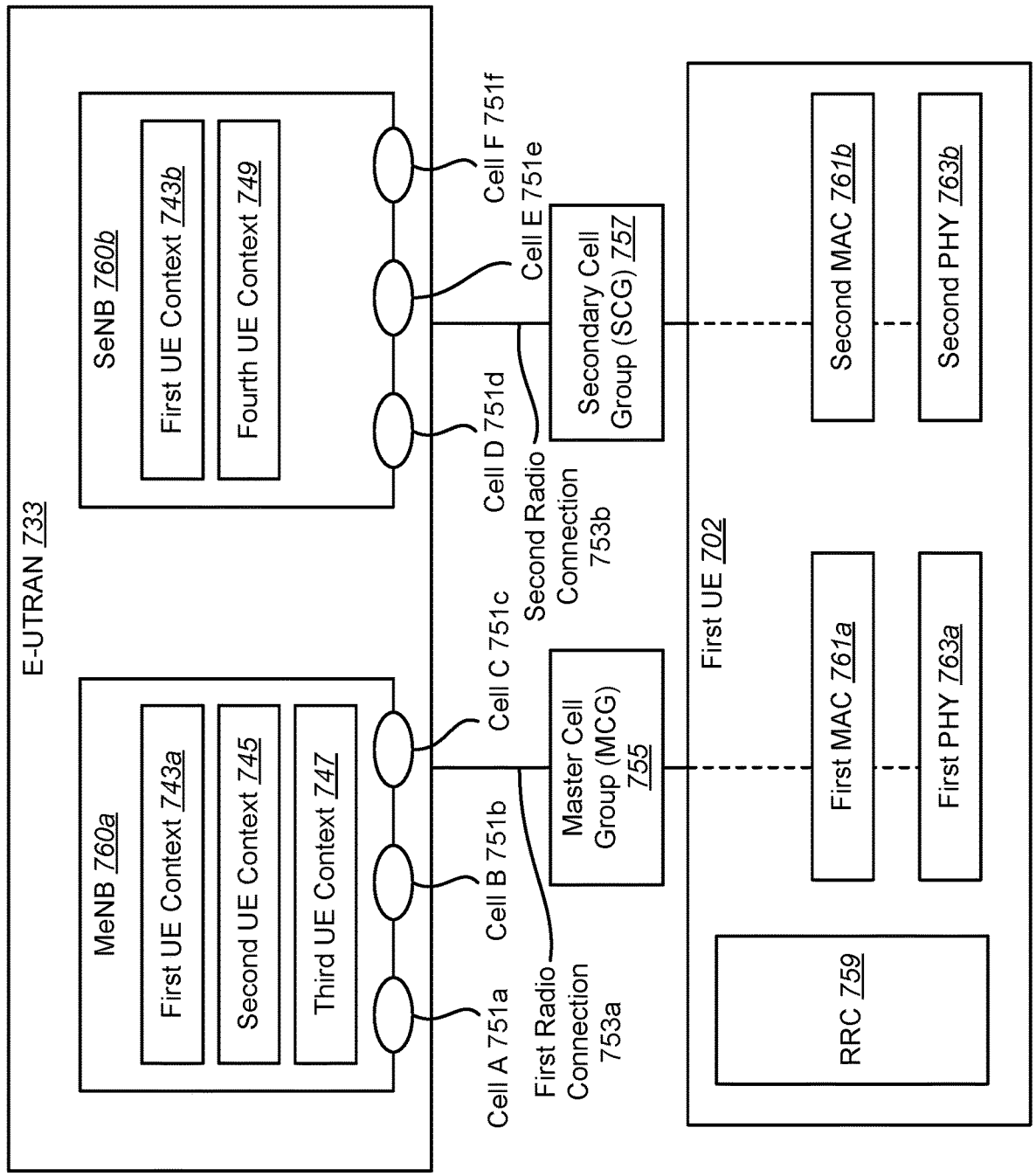
FIG. 7 is a block diagram illustrating one configuration of an E-UTRAN and a UE in which systems and methods for dual-connectivity operation may be implemented.

FIG. 7 is a block diagram illustrating one configuration of an E-UTRAN 733 and a UE 702 in which systems and methods for dual-connectivity operation may be implemented. The UE 702 and the E-UTRAN 733 described in connection with FIG. 7 may be implemented in accordance with corresponding elements described in connection with at least one of FIGS. 1 and 6.

In traditional carrier aggregation, a single eNB 760 is assumed to provide multiple serving cells 751 for a UE 702. Even in scenarios where two or more cells 751 may be aggregated (e.g., a macro cell aggregated with remote radio head (RRH) cells 751), the cells 751 may be controlled (e.g., scheduled) by a single eNB 760. However, in a small cell deployment scenario, each eNB 760 (e.g., node) may have its own independent scheduler. To utilize radio resources of both eNBs 760*a-b*, the UE 702 may connect to both eNBs 760*a-b*.

When carrier aggregation is configured, the UE 702 may have one RRC connection with the network. A radio interface may provide carrier aggregation. During RRC connection establishment, re-establishment and handover, one serving cell 751 may provide NAS mobility information (e.g., a tracking area identity (TAI)). During RRC connection re-establishment and handover, one serving cell 751 may provide a security input. This cell 751 may be referred to as the primary cell (PCell). In the downlink, the component carrier corresponding to the PCell may be the downlink primary component carrier (DL PCC), while in the uplink it may be the uplink primary component carrier (UL PCC).

Depending on UE 702 capabilities, one or more SCells may be configured to form together with the PCell a set of serving cells 751*a-f*. In the downlink, the component carrier corresponding to a SCell may be a downlink secondary component carrier (DL SCC), while in the uplink it may be an uplink secondary component carrier (UL SCC).

The configured set of serving cells 751*a-f* for the UE 702, therefore, may consist of one PCell and one or more SCells. For each SCell, the usage of uplink resources by the UE 702 (in addition to the downlink resources) may be configurable. The number of DL SCCs configured may be larger than or equal to the number of UL SCCs and no SCell may be configured for usage of uplink resources only.

From a UE 702 viewpoint, each uplink resource may belong to one serving cell 751. The number of serving cells 751 that may be configured depends on the aggregation capability of the UE 702. The PCell may only be changed using a handover procedure (e.g., with a security key change and a random access channel (RACH) procedure). The PCell may be used for transmission of the PUCCH. Unlike the SCells, the PCell may not be de-activated. Re-establishment may be triggered when the PCell experiences radio link failure (RLF), not when the SCells experience RLF. Furthermore, NAS information may be taken from the PCell.

The reconfiguration, addition and removal of SCells may be performed by an RRC 759. At intra-LTE handover, RRC 759 may also add, remove or reconfigure SCells for usage with a target PCell. When adding a new SCell, dedicated RRC signaling may be used for sending all required system information of the SCell (e.g., while in connected mode, UEs 702 need not acquire broadcasted system information directly from the SCells).

However, to connect to both eNBs 760 that have different schedulers, dual-connectivity between the UE 702 and E-UTRAN 733 may be required. In addition to Release-11 operation, a UE 702 operating according to Release-12 may be configured with dual-connectivity (which may also be called multi-connectivity, inter-node carrier aggregation, inter-node radio aggregation, multi-flow, multi-cell cluster, multi-Uu, etc.).

The UE 702 may connect to E-UTRAN 733 with multiple Uu interfaces 639, 641, if configured. For example, a UE 702 may be configured to establish an additional radio interface (e.g., radio connection 753) by using one radio interface (radio connection 753). Hereafter, one eNB 760 is referred to as a master eNB (MeNB) 760*a*, which may also be called a primary eNB (PeNB). Another eNB 760 is referred to as s secondary eNB (SeNB) 760*b*. The Uu interface 639 (which may be called primary Uu interface) is a radio interface between the UE 702 and the MeNB 760*a*. The Uux interface 641 (which may be called secondary Uu interface) is a radio interface between the UE 702 and the SeNB 760*b*.

In one configuration, the UE 702 may not be required to be aware of the MeNB 760*a* and SeNB 660*b* as long as the UE 702 is aware of multiple Uu interfaces 639, 641 (i.e., MCG 155 and SCG 157) with the E-UTRAN 733. Also, the E-UTRAN 733 may provide multiple Uu interfaces with the same or different eNBs 760.

In one configuration, the MeNB 760*a* and SeNB 760*b* could be the same eNB 760. The multiple Uu interfaces 639, 641 (e.g., dual-connectivity) can be achieved even by a single eNB 760. The UE 702 may be able to connect more than one Uux interface 641 (e.g., Uu1, Uu2, Uu3 . . . ). Each Uu interface 639, 641 can have carrier aggregation. Therefore, the UE 702 may be configured with more than one set of serving cells 751 in case of CA. In dual connectivity (i.e, two sets), one set of serving cells 751 may be the MCG 755, another set of serving cells may be the SCG 757.

Multiple Uu interfaces 639, 641 are described herein, but this functionality could be realized by a single Uu interface 639 depending on the definition of Uu interface 639. Dual-connectivity may be realized by a single Uu interface 639 or a single radio interface depending on the definition of the interface. A radio interface can be defined as an interface between a UE 702 and the E-UTRAN 733, but not an interface between the UE 702 and an eNB 760. For example, one radio interface can be defined as an interface between a UE 702 and the E-UTRAN 733 with dual-connectivity. Therefore, the difference between the Uu 639 and Uux 641 above may be considered as a characteristic of cells 751. The Uu interface 639 and the Uux interface 641 may be rephrased by a set A of cell(s) and a set B of cell(s), respectively. Also, a radio interface and an additional radio interface can be rephrased by a master cell group (MCG) 755 and secondary cell group (SCG) 757, respectively.

In some implementations, the E-UTRAN 733 may include a MeNB 760*a* and a SeNB 760*b*. The UE 702 may communicate with the MeNB 760*a* via a first radio connection 753*a*. The UE 702 may communicate with the SeNB 760*b* via the second radio connection 753*b*. While FIG. 7 depicts one first radio connection 753*a* and one second radio connection 753*b*, the UE 702 may be configured with one first radio connection 753*a* and one or more second radio connections 753*b*. The MeNB 760*a* and SeNB 760*b* may be implemented in accordance with the eNB 160 described in connection with FIG. 1.

The MeNB 760*a* may provide multiple cells 751*a-c* for connection to one or more UEs 702. For example, the MeNB 760*a* may provide cell A 751*a*, cell B 751*b* and cell C 751*c*. Similarly, the SeNB 760*b* may provide multiple cells 751*d-f*. The UE 702 may be configured to transmit/receive on one or more cells (e.g., cell A 751*a*, cell B 751*b* and cell C 751*c*) for the first radio connection 753*a* (e.g., a master cell group (MCG) 755). The UE 702 may also be configured to transmit/receive on one or more other cells (e.g., cell D 751*d*, cell E 751*e* and cell F 751*f*) for the second radio connection 753*b* (e.g., a secondary cell group 757).

The MCG 755 may contain one PCell and one or more optional SCell(s). The SCG 757 may contain one PCell-like cell (that may be called PCell, primary SCell (PSCell), secondary PCell (SPCell), PCellscg, SCG PCell, etc.) and one or more optional SCell(s). If the UE 702 is configured to transmit/receive on multiple cells 751*a-f* for a radio connection 753*a-b*, a carrier aggregation operation may be applied to the radio connection 753*a-b*. In one configuration, each radio connection 753 may be configured with a primary cell and no, one, or more secondary cell(s). In another configuration, at least one radio connection 753 may be configured with a primary cell and no, one, or more secondary cell(s) and the other radio connections 753 may be configured with one or more secondary cell(s). In yet another configuration, at least one radio connection 753 may be configured with a primary cell and no, one, or more secondary cell(s) and the other radio connections 753 may be configured with a PCell-like cell and no, one or more secondary cell(s).

One MAC entity 761 and one PHY entity 763 may be mapped to one cell group. For example, a first MAC entity 761*a* and a first PHY entity 763*a* may be mapped to the MCG 755. Similarly, a second MAC entity 761*b* and a second PHY entity 763*b* may be mapped to the SCG 757. The UE 702 may be configured with one MCG 755 (e.g., the first radio connection 753*a*) and optionally one or more SCG(s) 757 (e.g., the second connection 753*b*).

The MeNB 760*a* manages and stores UE contexts for the first radio connection 753*a*. The UE contexts may be RRC contexts (e.g., configurations, configured cells 751, security information, etc.), QoS information and UE 702 identities for each UE 702 for configured cells 751 for the UE 702. For example, the MeNB 760*a* may manage and store a first UE context 743*a*, a second UE context 745 and a third UE context 747.

The SeNB 760*b* manages and stores UE contexts for the second radio connection 753*b* for each UE 702 for configured cells 751 for the UE 702. For example, the SeNB 760*b* may manages and store the first UE context 743*b* and a fourth UE context 749. An eNB 760 can behave as both MeNB 760*a* and SeNB 760*b*. Therefore, the eNB 760 may manage and store UE contexts for UEs 702 connected to a first radio connection 753*a* and UE contexts for UEs 702 connected to a second radio connection 753*b*.

In some implementations, the MAC entities 761*a-b* may have an interface with an RRC entity 759. The RRC entity 759 may receive RRC messages (e.g., RRC connection reconfiguration message, connection control message, handover command, etc.) from a RRC entity (not shown) of the E-UTRAN 733. The RRC entity 759 may also transmit RRC messages (e.g. RRC connection reconfiguration complete message) to the RRC entity (not shown) of the E-UTRAN 733.

Figure 8:
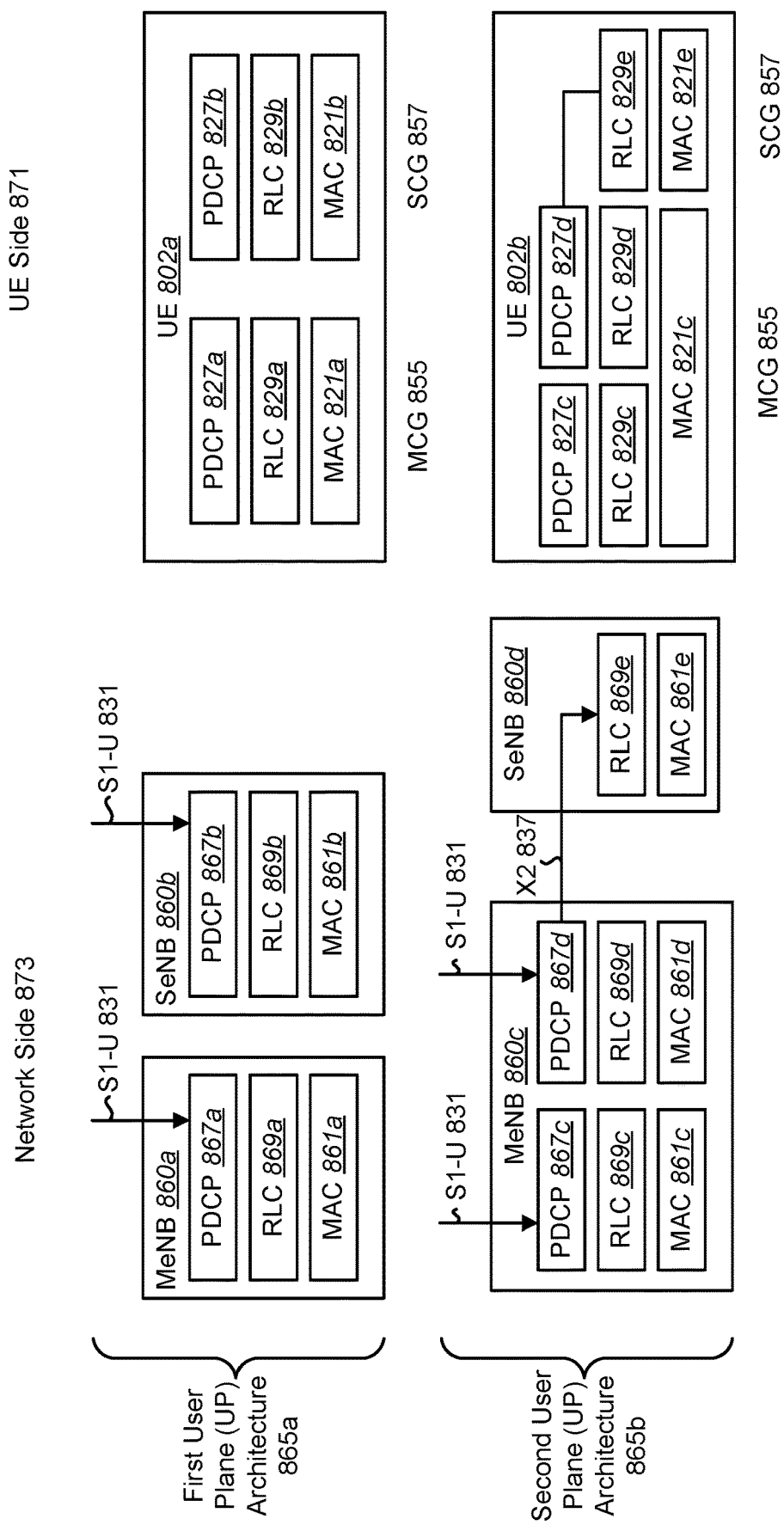
FIG. 8 is a block diagram illustrating a first user plane (UP) architecture and a second UP architecture.

FIG. 8 is a block diagram illustrating a first user plane (UP) architecture 865*a* and a second UP architecture 865*b*. The UE 802 and the eNB 860 described in connection with FIG. 8 may be implemented in accordance with corresponding elements described in connection with at least one of FIGS. 1 and 6.

In the first UP architecture 865*a*, the S1-U interface 831 terminates at an MeNB 860*a* and an SeNB 860*b*. The UP of the MeNB 860*a* for a DRB includes a PDCP entity 867*a*, an RLC entity 869*a*, and a MAC entity 861*a*. The UP of the SeNB 860*b* for a DRB includes a PDCP entity 867*b*, an RLC entity 869*b*, and a MAC entity 861*b*. The MCG 855 of the UE 802*a* for a DRB includes a PDCP 827*a* entity, an RLC 829*a* entity, and a MAC 821*a* entity. The SCG 857 of the UE 802*a* for a DRB includes a PDCP 827*b* entity, an RLC 829*b* entity, and a MAC 821*b*. In the first UP architecture 865*a*, the PDCP 867*a* of the MeNB 860*a* is independent of the PDCP 867*b* of the SeNB 860*b*. In other words, for the first UP architecture 865*a* there is no bearer split.

In the second UP architecture 865*b*, the S1-U interface 831 terminates at the MeNB 860*c*. The UP of the MeNB 860*c* includes a first PDCP 867*c* and second PDCP 867*d*, a first RLC 869*c* and second RLC 869*d* and a first MAC 861*c* and second MAC 861*d*. The first PDCP 867*c* and the first RLC 869*c* are for a first DRB. The second PDCP 867*d* and the second RLC 869*d* are for a second DRB. The UP of the SeNB 860*b* includes an RLC 869*e* and a MAC 861*e*. The MCG 855 of the UE 802*a* for a DRB includes a PDCP 827*c* entity, an RLC 829*c* entity, and a MAC 821*c* entity. The SCG 857 of the UE 802*a* for a DRB includes a PDCP 827*e* entity, an RLC 829*e* entity, and a MAC 821*e*. The first PDCP 827*c* and the first RLC 829*c* are for the first DRB. The second PDCP 827*d* and the second RLC 829*d*, and the RLC 829*e* are for the second DRB. In the second UP architecture 865*b*, the second PDCP 867*d* of the MeNB 860*c* is coupled to the RLC 869*e* of the SeNB 860*b* via an X2 interface 837. In other words, for the second UP architecture 865*b* there is a bearer split. However, the second UP architecture 865*b* has independent RLCs 869 for the split bearers.

Both a contention-free random access procedure and a contention-based random access procedure are supported towards the SeNB 860*b*,*d*. The random access response message is sent from the eNB 860 to which the random access preamble was sent. A parallel random access procedure is supported if the random access preamble transmission is not overlapped. There is no requirement to coordinate physical random access channel (PRACH) resources in the network side.

For both MAC entities 861 of the MeNB 860*a*,*c* (e.g., the MCG 755) and the SeNB 860*b*,*d* (e.g., the SCG 757), the random access procedure is initiated by a PDCCH order or by the MAC sublayer itself. If this is a MAC entity of the SCG 757, the random access procedure may also be initiated by an RRC order as well.

A random access procedure on an SCell may only be initiated by a PDCCH order. If a UE 102 receives a PDCCH transmission consistent with a PDCCH order masked with its C-RNTI, and for a specific serving cell 751, the UE 102 may initiate a random access procedure on the serving cell.

For random access on the PCell and the PCell-like cell, a PDCCH order or an RRC optionally indicate the ra-PreambleIndex and the ra-PRACH-MaskIndex. For random access on an SCell, the PDCCH order indicates the ra-PreambleIndex with a value different from 000000 and the ra-PRACH-MaskIndex. The pTAG preamble transmission on PRACH and reception of a PDCCH order may be supported for the PCell and the PCell-like cell.

For an eNB 860 specific bearer, where the bearer is mapped into either the MeNB 860*a*,*c* or the SeNB 860*b*,*d*, the UE 102 may send BSR information related to the specific bearer towards the eNB 860 to which the corresponding bearer belongs. Separate discontinuous reception (DRX) configurations may be supported for the MeNB 860*a*,*c* and the SeNB 860*b*,*d* and separate DRX operations (e.g., timers and active time) should be allowed for MeNB 860*a*,*c* and SeNB 860*b*,*d*. From a UE power consumption point of view, DRX coordination would be beneficial for UE 102 power consumption.

Activation and deactivation are supported for the SCG 757. The MeNB 860*a*,*c* can activate and deactivate cells 751 associated with the MeNB 860*a*,*c*. The SeNB 860*b*,*d* can activate and deactivate cells 751 associated with the SeNB 860*b*,*d*. The MAC entity 761 of the UE 102 may be configured per cell group (e.g., one MAC 761 for the MCG 755 and the other MAC 761 for the SCG 757).

In one configuration, the maximum number of serving cells 751 per UE 102 for carrier aggregation is 5. Carrier aggregation may be supported in the MeNB 860*a*,*c* and the SeNB 860*b*,*d*. In other words, the MeNB 860*a*,*c* and the SeNB 860*b*,*d* may have multiple serving cells 751 for a UE 102. In dual-connectivity, a UE 102 may be connected to one MeNB 860*a*,*c* and one SeNB 860*b*,*d*. A timing advance group (TAG) may only comprise cells 751 of one eNB 860. In one configuration, the maximum number of TAGs per UE 102 for carrier aggregation is 4. In one configuration, the MCG 755 and the SCG 757 may operate either in the same or in different duplex schemes.

The SeNB 860*b*,*d* may have one special cell 751 (e.g., PCell-like cell) containing at least PUCCH functionality, and potentially also some other PCell functionality. However, it is not necessary to duplicate all PCell functionality for the special cell 751. For the special cell 751 in the SCG 757, there is no need to provide NAS security and NAS mobility functions in the SeNB 860*b*,*d*. At least one cell 751 in the SeNB 860*b*,*d* has configured UL and one cell 751 is configured with PUCCH resources.

No radio link monitoring (RLM) is needed on a cell 751 not carrying PUCCH in the SeNB 860*b*,*d*. Radio link failure (RLF), if supported, of any cell 751 of the SCG 757 does not trigger RRC connection re-establishment. The cell 751 in the SeNB 860*b*,*d* which is configured with PUCCH resources may not be cross-carrier scheduled.

The first UP architecture 865*a* and the second user plane architecture 865*b* may be implemented by RRC configuration. Deviations in the protocol stack for different configurations should be limited. For instance, a new specification of PDCP-SeNB should be not introduced. In one configuration, some bearers of a UE 102 may be split (as in the second UP architecture 865b) while other bearers are only served by the MeNB 860a,c. In another configuration, some bearers of a UE 102 may be served by the SeNB 860b,d (as in the first UP architecture 865a) while others are only served by the MeNB 860a,c. RLC status PDUs may transmitted to corresponding eNBs 860 via the corresponding Uu interface 639 or Uux interface 641.

Figure 9:
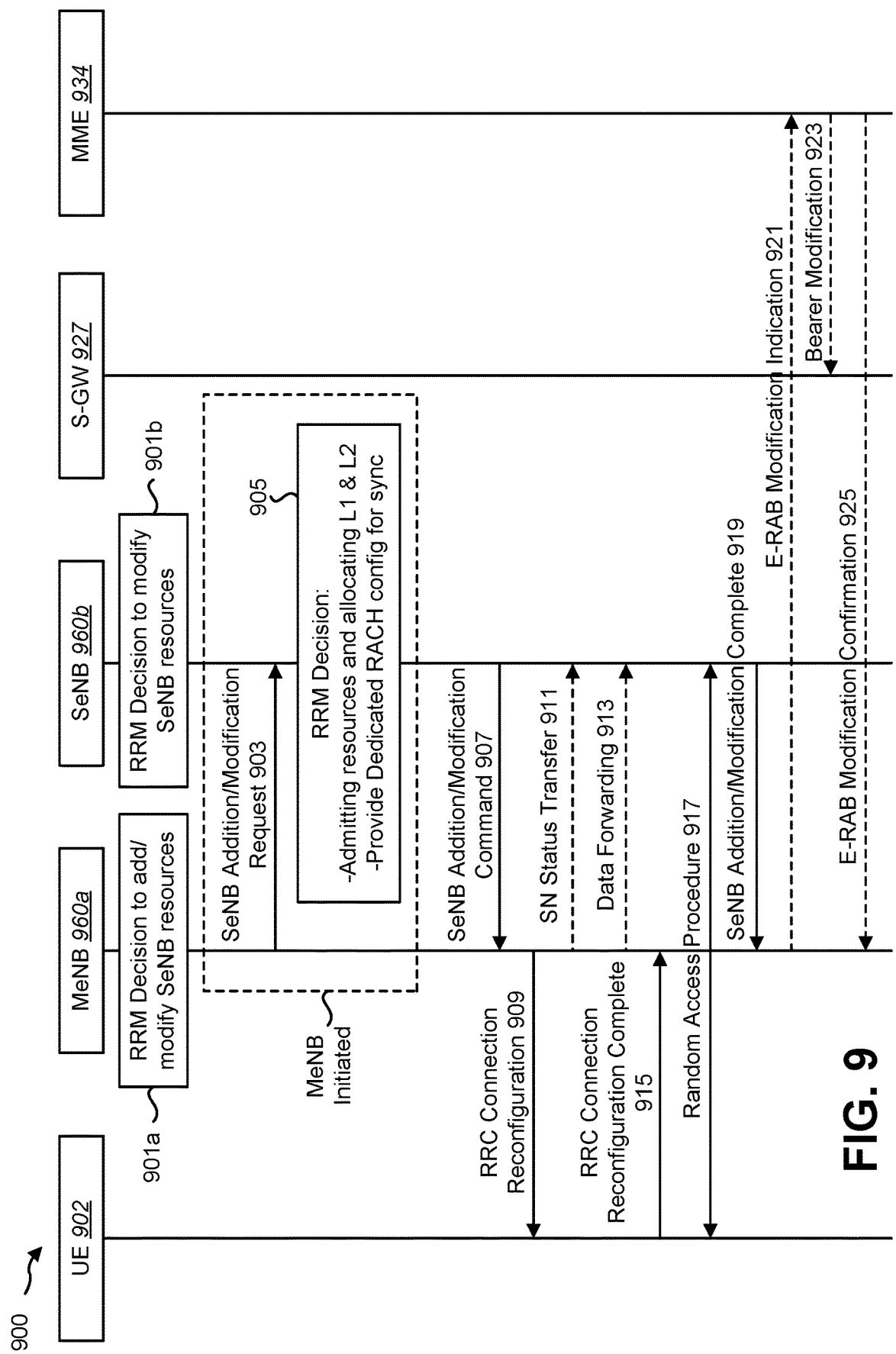
FIG. 9 is a thread diagram illustrating one configuration of secondary evolved Node B (SeNB) addition and modification.

FIG. 9 is a thread diagram illustrating one configuration of SeNB 960b addition and modification 900. The UE 902 described in connection with FIG. 9 may be implemented in accordance with the UE 102 described in connection with FIG. 1. The MeNB 960a and the SeNB 960b described in connection with FIG. 9 may be implemented in accordance with the eNB 160 described in connection with FIG. 1. FIG. 9 depicts the overall signaling scheme for the addition and modification of SeNB 960b resources (e.g., SCG 157 addition) for dual-connectivity operation. It should be noted that this signaling scheme illustrates the similarities between addition and modification signaling schemes. S1-MME 629 and X2 637 signaling that is relevant only for the first UP architecture 865a is shown with dashed lines (steps 911, 913 and 921-925). It is assumed that the S-GW 927 does not change.

The MeNB 960a may decide 901a to request the SeNB 960b to add or modify radio resources for a specific E-UTRAN radio access bearer (E-RAB). The decision 901a to request the SeNB 960b to add or modify radio resources may be a radio resource management (RRM) decision. Alternatively, the SeNB 960b may decide 901b to modify radio resources for a specific E-RAB. The decision 901b to modify radio resources may be an RRM decision. In one implementation, the SeNB 960b and the MeNB 960a may coordinate to ensure that the capabilities of the UE 902 are not exceeded.

If the MeNB 960a initiates the SeNB 960b addition or modification, the MeNB 960a may send 903 an SeNB addition/modification request to the SeNB 960b to allocate or modify radio resources. The SeNB addition/modification request may include E-RAB characteristics (e.g., E-RAB parameters and transport network layer (TNL) address information corresponding to an UP architecture 865), UE 902 capabilities, the current radio resource configuration of the UE 902, etc. The RRM of the SeNB 960b may decide 905 whether to admit the resource request. If the RRM entity in the SeNB 960b is able to admit the resource request, then the SeNB 960b may configure the respective radio resources and respective transport network resources (based on the UP architecture 865). The SeNB 960b may also allocate a dedicated RACH preamble for the UE 902 so that synchronisation of the SeNB 960b radio resource configuration may be performed.

The SeNB 960b may send 907 an SeNB addition/modification command to the MeNB 960a. For example, the SeNB 960b may provide the new radio resource configuration to the MeNB 960a. For the first UP architecture 865a, the SeNB addition/modification command may include S1 interface DL TNL address information for the respective E-RAB. For the second UP architecture 865b, the SeNB addition/modification command may include X2 interface DL TNL address information.

The MeNB 960a may endorse the new radio resource configuration and may trigger the UE 902 to apply it. The MeNB 960a may send 909 an RRC connection reconfiguration message (e.g., an RRC connection reconfiguration message that includes SCG configuration parameters for SCG 157 addition) to the UE 902. The UE 902 may start to apply the new radio resource configuration.

In the case of the first UP architecture 865a, the MeNB 960a may, dependent on respective E-RAB characteristics, take actions to minimise service interruption due to activation of dual-connectivity. The MeNB 960a may send 911 a sequence number (SN) status report to the SeNB 960b. The MeNB 960a may perform 913 data forwarding to the SeNB 960b. In one configuration, the UP resources established for data forwarding for the first UP architecture 865a may be released explicitly.

Upon completing the reconfiguration procedure, the UE 902 may send 915 an RRC connection reconfiguration complete message to the MeNB 960a. The UE 902 may perform synchronisation towards a cell 751 of the SeNB 960b. For example, the UE 902 may perform 917 a random access procedure with the SeNB 960b, if needed. The RRC connection reconfiguration complete message may be sent 915 after the synchronisation procedure or may be before the synchronisation procedure. In the case of the second UP architecture 865b, transmission of user plane data from the SeNB 960b to the UE 902 may take place after step 915 or 917 depending on the synchronisation procedure.

The SeNB 960b may send 919 a SeNB addition/modification complete message to the MeNB 960a. The SeNB 960b reports to the MeNB 960a the detection of synchronisation with the UE 902, confirming that the new configuration is in use. Receipt of the SeNB addition/modification complete message by the MeNB 960a successfully completes the overall SeNB addition/modification procedure on the X2 interface. Step 919 may be either necessary as described above or in the reverse direction (from MeNB 960a to SeNB 960b).

In the case of the first UP architecture 865a, an update of the UP path towards the EPC 623 may be performed. The MeNB 960a may send 921 an E-RAB modification indication to the MME 934. The MME 934 and the S-GW 927 may perform 923 bearer modification. The MME 934 may send 925 an E-RAB modification confirmation to the MeNB 960a.

Figure 10:
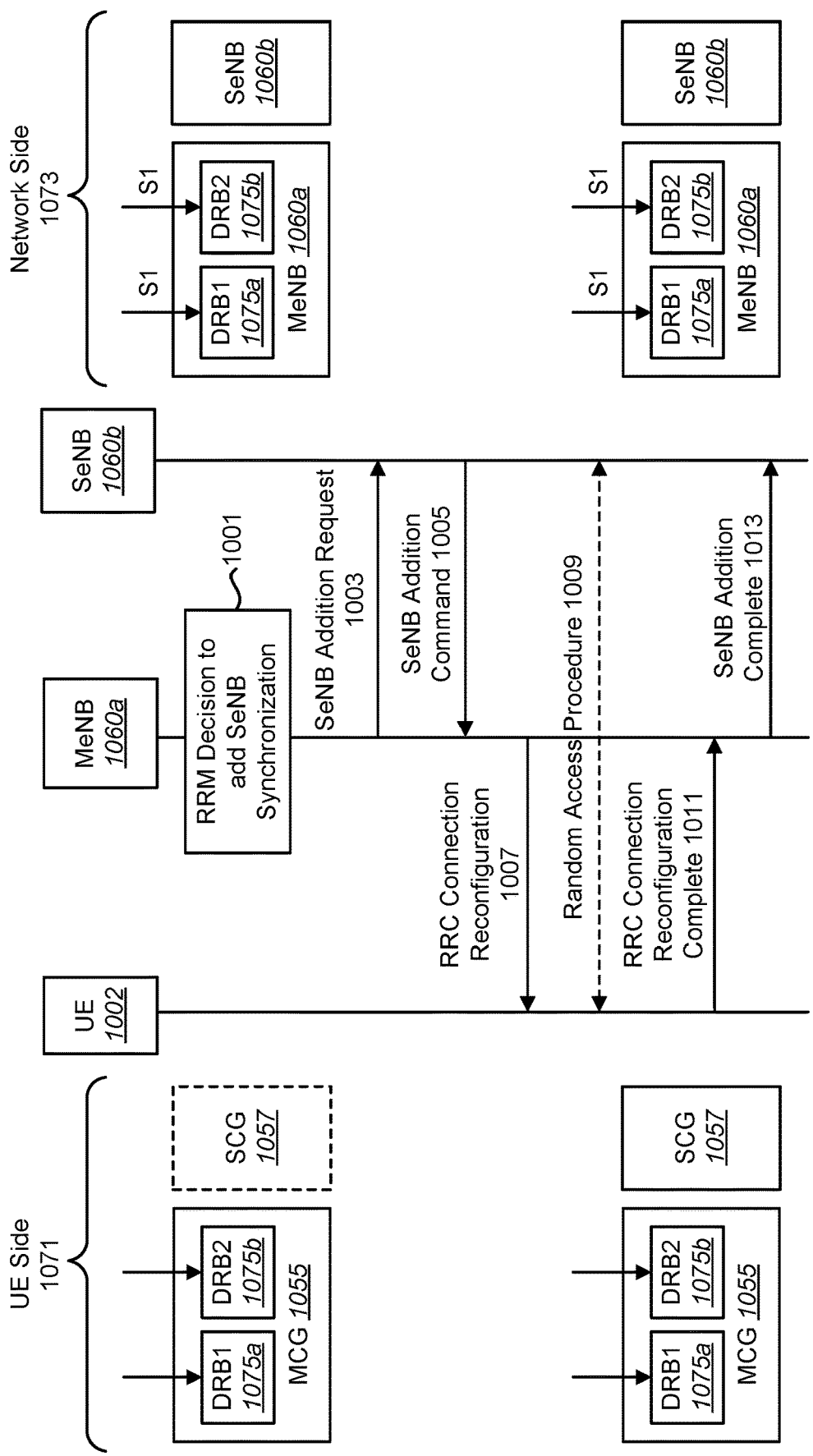
FIG. 10 is a thread diagram illustrating one configuration of an RRC connection reconfiguration procedure.

FIG. 10 is a thread diagram illustrating one configuration of an RRC connection reconfiguration procedure. In particular, FIG. 10 illustrates one example of an SeNB 1060b addition (which may also be referred to as SCG 1057 addition) procedure. The UE 1002 described in connection with FIG. 10 may be implemented in accordance with the UE 102 described in connection with FIG. 1. The MeNB 1060a and the SeNB 1060b described in connection with FIG. 10 may be implemented in accordance with the eNB 160 described in connection with FIG. 1. In this example, it is assumed that a first data radio bearer (DRB1) 1075a and a second data radio bearer (DRB2) 1075b have been established on the UE side 1071 and on the network side 1073.

The MeNB 1060a may decide 1001 to request the SeNB 1060b to add radio resources for a specific E-RAB. For example, the MeNB 1060a may perform an RRM decision to add SeNB 1060b synchronization. The MeNB 1060a may send 1003 an SeNB addition request to the SeNB 1060b to allocate or modify radio resources.

The SeNB 1060b may send 1005 an SeNB addition command to the MeNB 1060a. The SeNB addition command may provide a new radio resource configuration to the MeNB 1060a.

The MeNB 1060a may endorse the new radio resource configuration of the SeNB 1060b. The MeNB 1060a may trigger the UE 1002 to apply the new radio resource configuration of the SeNB 1060b by sending 1007 an RRC connection reconfiguration (RRCConnectionReconfiguration) message to the UE 1002. The RRC connection reconfiguration message may include SCG configuration parameters for SCG 1057 addition.

Upon receiving the RRC connection reconfiguration message, the UE 1002 may start to apply the new configuration. In other words, upon receipt of the RRC connection reconfiguration message, if the RRC connection reconfiguration message includes SCG configuration parameters for SCG 1057 addition and the UE 1002 is able to comply with the configuration included in this message, the UE 1002 may perform or continue an RRC connection reconfiguration procedure. An RRC connection reconfiguration procedure including SCG configuration parameters may be different from an RRC connection reconfiguration procedure including the mobilityControlInfo and not including SCG configuration parameters or an RRC connection reconfiguration procedure not including the mobilityControlInfo and not including SCG configuration parameters. A structure of an RRC connection reconfiguration message can identify which procedure UE 1002 should follow.

In one implementation, the RRC connection reconfiguration message has a structure that the SCG configuration parameters do not include a DRB 1075 configuration. A DRB 1075 configuration may include all, some, or at least one of a PDCP 827 configuration, RLC 829 configuration, logical channel configuration, logical channel identity and/or EPS bearer identity.

An E-UTRAN radio access bearer (E-RAB) may transport the packets of an EPS bearer between the UE 1002 and the EPC 623. When an E-RAB exists, there is a one-to-one mapping between this E-RAB and an EPS bearer. A data radio bearer may transport the packets of an EPS bearer between a UE 1002 and an eNB 1060. When a data radio bearer exists, there is a one-to-one mapping between this data radio bearer and the EPS bearer/E-RAB. The DRB 1075 configuration is not included in this step. In this example, E-UTRAN 533 ensures that the establishment of RBs (e.g., DRB 1075, because a SRB is not configured for the SCG 1057) may be included only when the SCG 1057 is added. Therefore, SCG 1057 addition without RB establishment on the SCG 1057 is performed.

The UE 1002 may start synchronizing to the DL of the target cell of the SCG 1057. The target cell of the SCG 1057 may also be referred to as the PCell-like cell, primary SCell (PSCell), secondary PCell (SPCell), PCellscg, SCG PCell, etc. The UE 102 may establish a MAC 761 entity of the SCG 1057. The UE 1002 may apply the value of the newUE-Identity as the cell-radio network temporary identifier (C-RNTI) for the SCG 1057.

The UE 1002 may configure lower layers of the SCG 1057 in accordance with a received RRC common (e.g., radioResourceConfigCommon) message for SCG 1057. The UE 1002 may configure lower layers of the SCG 1057 in accordance with any additional fields that may be included in the received SCG configuration parameters. For example, RACH-ConfigDedicated, which is optionally included in the SCG configuration parameters, may be provided to the MAC 761 entity for the SCG 1057. If the RRC connection reconfiguration message includes a radioResourceConfigDedicated parameter, the UE 1002 may perform a radio resource configuration procedure. It should be noted that the SN Status transfer step 911 and data forwarding step 913 from FIG. 9 are eliminated because RBs are not established in SeNB 1060*b*.

The UE 1002 may perform 1009 a random access procedure to the SeNB 1060*b* for synchronization towards the target cell (e.g., the PCell-like cell) of the SeNB 1060*b*. The random access procedure to the SeNB 1060*b* may be part of the RRC connection reconfiguration procedure. The random access procedure may be performed 1009 by the MAC 761 of the SCG 1057.

The UE 1002 may send 1011 an RRC connection reconfiguration complete (RRCConnectionReconfigurationComplete) message to the MeNB 1060*a*. After the MAC 761 of the SCG 1057 successfully completes the random access procedure, the UE 1002 may complete the reconfiguration procedure. The UE 1002 may submit an RRC connection reconfiguration complete message to lower layers of the MCG 1055 for transmission to the MeNB 1060*a*. One configuration of random access failure handling is described in connection with FIG. 12 below.

It should be noted that in FIG. 10, the random access procedure (step 1009) is assumed to occur before sending the RRC connection reconfiguration complete message (step 1011) because the main purpose of SCG 1057 addition without RB establishment is synchronization with the SeNB 1060*b* by a random access procedure. In this configuration of RRC connection reconfiguration, even if random access failure occurs, DRBs 1075 are not involved in the RRC connection reconfiguration procedure and the DRBs 1075 are maintained on the MCG 1055.

The random access procedure (step 1009) may also occur after sending the RRC connection reconfiguration complete message (step 1011). After performing configurations based on the RRC connection reconfiguration message, the UE 1002 may submit the RRC connection reconfiguration complete message to lower layers of the MCG 1055 for transmission. The UE 1002 may then initiate a random access procedure to the SeNB 1060*b*. In this case, the SeNB addition complete message may be sent from the SeNB 1060*b* to the MeNB 1060*a*, in a reverse direction 1013 from what is shown in FIG. 10.

The MeNB 1060*a* may send 1013 an SeNB addition complete message to the SeNB 1060*b*. The MeNB 1060*a* may report to the SeNB 1060*b* the completion of SCG 1057 addition with the UE 1002, confirming that the new configuration is in use. Receipt of the SeNB addition complete message by the SeNB 1060*b* may successfully complete the overall SeNB 1060*b* addition procedure on the X2 interface 637. Here, SCG 1057 addition is completed without RB establishment on the SCG 1057, which is indicated by the transition from a dashed line to a solid line of the SCG 1057 in UE side 1071.

Figure 11:
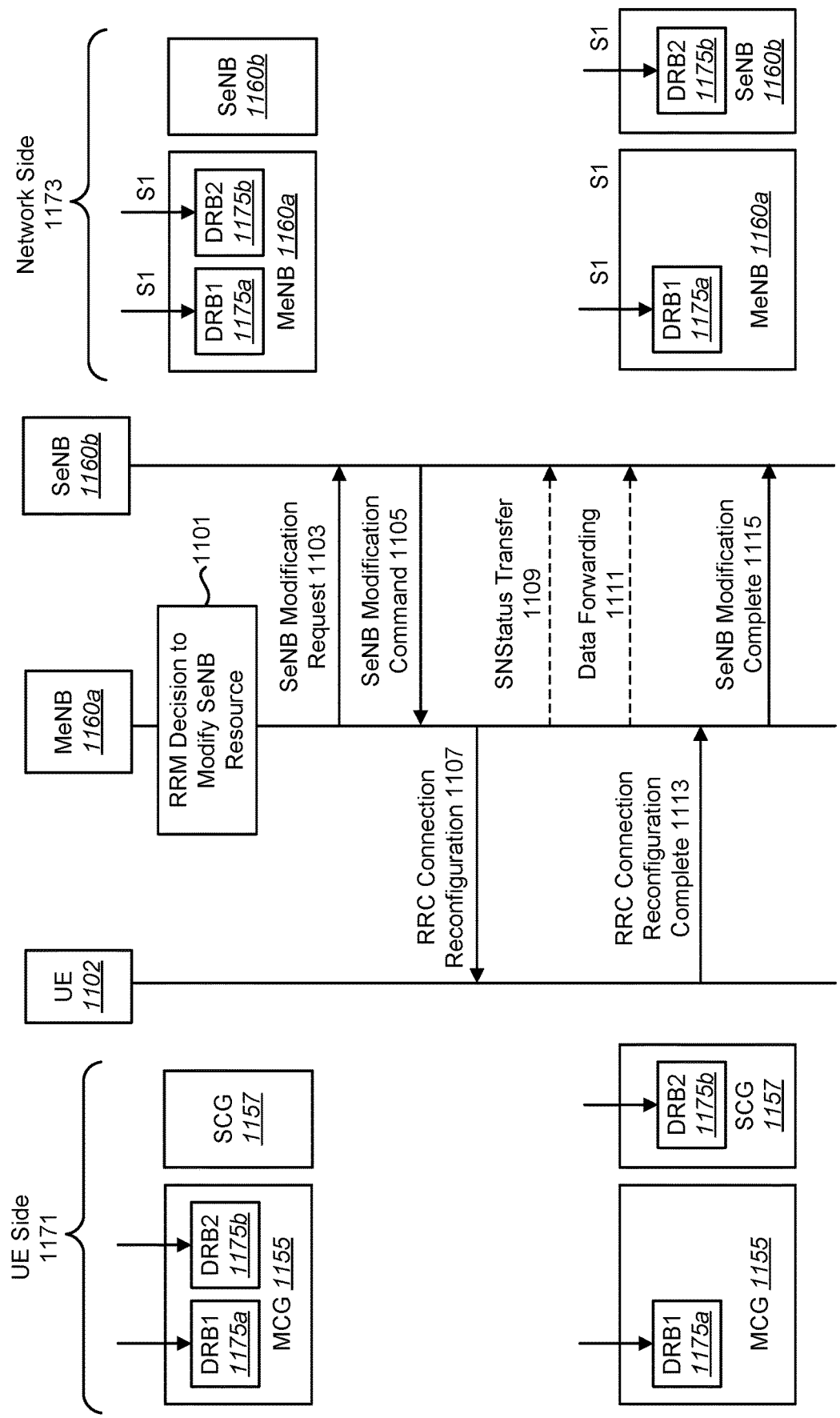
FIG. 11 is a thread diagram illustrating another configuration of an RRC connection reconfiguration procedure.

FIG. 11 is a thread diagram illustrating another configuration of an RRC connection reconfiguration procedure. In particular, FIG. 11 illustrates one example of an SeNB 1160*b* modification (which may also be referred to as SCG 1157 modification) procedure. The UE 1102 described in connection with FIG. 11 may be implemented in accordance with the UE 102 described in connection with FIG. 1. The MeNB 1160*a* and the SeNB 1160*b* described in connection with FIG. 11 may be implemented in accordance with the eNB 160 described in connection with FIG. 1.

In this example, it is assumed that a first data radio bearer (DRB1) 1175*a* and a second data radio bearer (DRB2) 1175*b* have been established on the UE side 1171 and on the network side 1173. Furthermore, an SeNB 1160*b* may be initially added, as indicated by the solid line of the SCG 1157 in the UE side 1171. The addition of the SeNB 1160*b* may be accomplished as described above in connection with FIG. 10.

To relocate the second data radio bearer (DRB2) 1175*b* of the MCG 1155 to the SCG 1157, an SCG 1157 modification (also referred to as SeNB 1160*b* modification) procedure may be performed. The MeNB 1160*a* may decide 1101 to request the SeNB 1160*b* to modify radio resources for a specific E-RAB. For example, the MeNB 1160*a* may perform an RRM decision to modify SeNB 1160*b* resources. The MeNB 1160*a* may send 1103 an SeNB modification request to the SeNB 1160*b* to modify radio resources. The MeNB 1160*a* may request the SeNB 1160*b* to configure DRB for second data radio bearer (DRB2) 1175*b*. Alternatively, the SeNB 1160*b* may decide 901*b* to modify radio resources for a specific E-RAB (as described above in connection with FIG. 9). In the case, steps 1101 and 1103 may be omitted.

The SeNB 1160*b* may send 1105 an SeNB modification command to the MeNB 1160*a*. The SeNB modification command may provide the new radio resource configuration to the MeNB 1160*a*. The new radio resource configuration may include a DRB configuration for an EPS bearer corresponding to the second data radio bearer (DRB2) 1175*b*.

The MeNB 1160*a* may endorse the new radio resource configuration of the SeNB 1160*b*. The MeNB 1160*a* may trigger the UE 1102 to apply the new radio resource configuration of the SeNB 1160*b* by sending 1107 an RRC connection reconfiguration (RRCConnectionReconfiguration) message to the UE 1102. The RRC connection reconfiguration message may include SCG configuration parameters for SCG 1157 modification.

Upon receiving the RRC connection reconfiguration message, the UE 1102 may start to apply the new configuration (i.e., upon receiving the RRC connection reconfiguration message, the UE 1102 may start an RRC connection reconfiguration procedure). In other words, upon receipt of the RRC connection reconfiguration message, if the RRC connection reconfiguration message includes SCG configuration parameters for SCG 1157 modification and the UE 1102 is able to comply with the configuration included in this message, the UE 1102 may perform or continue an RRC connection reconfiguration procedure.

The RRC connection reconfiguration message may include SCG configuration parameters for SCG 1157 modification. For example, the SCG configuration parameters for SCG 1157 modification may include a DRB configuration. The DRB configuration may include DRB configuration parameters for remapping a DRB 1175 (e.g., DRB2 1175*b*) that is established on the MCG 1155 to the SCG 1157.

For a DRB 1175 that is established on the MCG 1155 and is going to be applied to the SCG 1157, in the case of the first UP architecture 865*a*, the UE 1102 may re-establish a PDCP 827 that is established on the MCG 1155 and may associate (e.g., remap) the PDCP 827 to the SCG 1157. The PDCP 827 may also be associated to (e.g., remapped to) the SCG 1157 before the re-establishment of the PDCP 827. For example, for a DRB 1175 that is established on the MCG 1155 and is going to be applied to the SCG 1157, the UE 1102 may associate a PDCP 827 that is established on the MCG 1155 to the SCG 1157 and the UE 1102 may re-establish the PDCP 827 for the DRB 1175 on the SCG 1157.

For a DRB 1175 that is established on the MCG 1155 and is going to be applied to the SCG 1157, the UE 1102 may re-establish a RLC 829 that is established on the MCG 1155 and associate the RLC 829 to the SCG 1157. The RLC 829 may also be associated to the SCG 1157 before the re-establishment of the RLC 829. For example, for a DRB 1175 that is established on the MCG 1155 and is going to be applied to the SCG 1157, the UE 1102 may associate a RLC 829 that is established on the MCG 1155 to the SCG 1157 and the UE 1102 may re-establish the RLC 829 for the DRB 1175 on the SCG 1157. In one configuration, an EPS bearer identity (e.g., eps-bearerIdentity) may act as the anchor for associating the re-established DRB 1175. By performing PDCP 827 re-establishment and RLC 829 re-establishment, the UE 1102 may resume the DRB 1175 on the SCG 1157. As illustrated in FIG. 11, DRB2 1157*b* that is initially on the MCG 1155 is remapped to the SCG 1157.

In the case of the second UP architecture 865*b*, SCG configuration parameters for SCG 1157 modification may include a DRB 1175 configuration so that the UE 1102 may establish an RLC 829 in the SCG 1157 for the DRB2 1175*b* that is established in the MCG 1155. The eps-bearerIdentity may act as the anchor for associating the DRB 1175 that is established in the MCG 1155 and the DRB 1175 that is established in the SCG 1157. The UE 1102 may re-establish a PDCP 827 for DRB2 1175*b* in the MCG 1155. The UE 1102 may re-establish an RLC 829 for DRB2 1175*b* in the MCG 1155. The MeNB 1160*a* may re-establish a PDCP 867 for DRB2 1175*b* in the MCG 1155 for the UE 1102. The MeNB 1160*a* may re-establish an RLC 869 for DRB2 1175*b* in the MCG 1155 for the UE 1102.

In the case of the first UP architecture 865*a*, the MeNB 1160*a* may perform actions to minimize service interruption due to the activation of dual-connectivity based on respective E-RAB characteristics. The MeNB 1160*a* may send 1109 an SN status report to the SeNB 1160*b*. The MeNB 1160*a* may perform 1111 data forwarding to the SeNB 1160*b*.

The UE 1102 may complete the reconfiguration procedure. The UE 1102 may send 1113 an RRC connection reconfiguration complete (RRCConnectionReconfigurationComplete) message to lower layers of the MCG 1155 for transmission. It should be noted that a random access procedure is omitted because synchronization with the SeNB 1160*b* has already been achieved.

The MeNB 1160*a* may send 1115 an SeNB modification complete message to the SeNB 1160*b*. The MeNB 1160*a* may report to the SeNB 1160*b* the completion of the SCG 1157 modification with the UE 1102, confirming that the new configuration is in use. Receipt of the SeNB modification complete message by the SeNB 1160*b* may successfully complete the overall SeNB 1160*b* modification procedure on the X2 interface 637.

Figure 12:
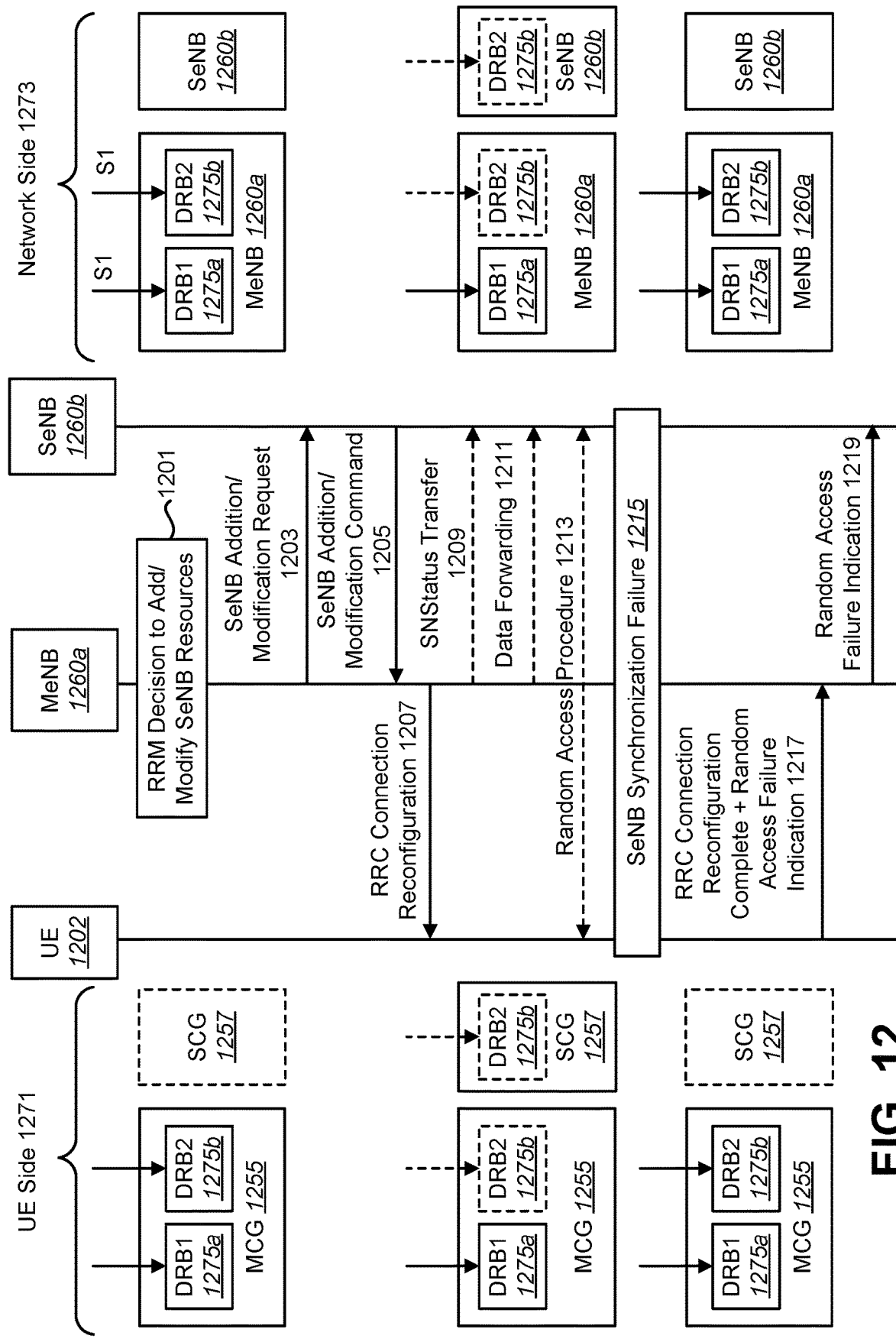
FIG. 12 is a thread diagram illustrating yet another configuration of an RRC connection reconfiguration procedure.

FIG. 12 is a thread diagram illustrating yet another configuration of an RRC connection reconfiguration procedure. In particular, FIG. 12 illustrates another example of an SeNB 1260*b* addition (which may also be referred to as SCG 1257 addition) procedure. The UE 1202 described in connection with FIG. 12 may be implemented in accordance with the UE 102 described in connection with FIG. 1. The MeNB 1260*a* and the SeNB 1260*b* described in connection with FIG. 12 may be implemented in accordance with the eNB 160 described in connection with FIG. 1. In this example, it is assumed that a first data radio bearer (DRB1) 1275*a* and a second data radio bearer (DRB2) 1275*b* have been established on the UE side 1271 and on the network side 1273.

The MeNB 1260*a* may decide 1201 to request the SeNB 1260*b* to add or modify radio resources. The MeNB 1260*a* may send 1203 an SeNB addition/modification request to the SeNB 1260*b* to allocate or modify radio resources. Alternatively, the SeNB 1160*b* may decide 901*b* to add or modify radio resources (as described above in connection with FIG. 9). In this case, steps 1201 and 1203 may be omitted.

The SeNB 1260*b* may send 1205 an SeNB addition/modification command to the MeNB 1260*a*. The SeNB addition/modification command may provide a new radio resource configuration to the MeNB 1260*a*.

The MeNB 1260a may endorse the new radio resource configuration of the SeNB 1260b. The MeNB 1260a may trigger the UE 1202 to apply the new radio resource configuration of the SeNB 1260b by sending 1207 an RRC connection reconfiguration (RRCConnectionReconfiguration) message to the UE 1202. The RRC connection reconfiguration message may include SCG configuration parameters for SCG 1257 addition/modification.

Upon receiving the RRC connection reconfiguration message, the UE 1202 may start to apply the new configuration (i.e., upon receiving the RRC connection reconfiguration message, the UE 1102 may start an RRC connection reconfiguration procedure). In other words, upon receipt of the RRC connection reconfiguration message, if the RRC connection reconfiguration message includes SCG configuration parameters for SCG 1257 addition/modification and the UE 1202 is able to comply with the configuration included in this message, the UE 1202 may perform an RRC connection reconfiguration procedure.

The SCG configuration parameters for SCG 1257 addition/modification may include a DRB 1275 configuration. In one implementation, the DRB 1275 configuration may include all, some, or at least one of a PDCP 827 configuration, RLC 829 configuration, logical channel configuration, logical channel identity and/or EPS bearer identity.

An E-RAB may transport the packets of an EPS bearer between the UE 1202 and the EPC 623. When an E-RAB exists, there is a one-to-one mapping between this E-RAB and an EPS bearer. A data radio bearer transports the packets of an EPS bearer between a UE and an eNB. When a data radio bearer exists, there is a one-to-one mapping between this data radio bearer and the EPS bearer/E-RAB. The DRB 1275 configuration is included in this step. In this example, the E-UTRAN 533 may not ensure that the establishment of RBs (e.g., DRB 1275, because a SRB is not configured for the SCG 1257) may be included only when SCG 1257 is added.

The UE 1202 may start synchronizing to the DL of the target cell of the SCG 1257. This may be accomplished as described above in connection with FIG. 10. The DRB 1275 configuration is applied if DRB configuration for the SCG 1257 is included in the RRC connection reconfiguration message. The DRB 1275 configuration includes parameters for remapping a DRB 1275 that is established on the MCG 1255 to the SCG 1257.

For a DRB 1275 that is established on the MCG 1255 and is going to be applied to (e.g., remapped to) the SCG 1257, in the case of the first UP architecture 865a, the UE 1202 may re-establish a PDCP 827 that is established on the MCG 1255 and associate the PDCP 827 to the SCG 1257. This may be accomplished as described above in connection with FIG. 11.

In the case of the second UP architecture 865b, SCG configuration parameters for SCG 1257 modification may include a DRB 1275 configuration so that the UE 1202 establishes an RLC 829 in the SCG 1257 for the DRB2 1275b that is established in the MCG 1255. This may be accomplished as described above in connection with FIG. 11.

In the case of the first UP architecture 865a, the MeNB 1260a may perform actions to minimize service interruption due to the activation of dual-connectivity based on respective E-RAB characteristics. The MeNB 1260a may send 1209 an SN status report to the SeNB 1260b. The MeNB 1260a may perform 1211 data forwarding to the SeNB 1260b.

The UE 1202 may start synchronizing to the DL of the target cell of the SCG 1257. The target cell of the SCG 1257 may also be referred to as the PCell-like cell, primary SCell (PSCell), secondary PCell (SPCell), PCellscg, SCG PCell, etc. The UE 1202 may establish a MAC 761 entity of the SCG 1257. The UE 1202 may apply the value of the newUE-Identity as the cell-radio network temporary identifier (C-RNTI) for the SCG 1257.

The UE 1202 may configure lower layers of the SCG 1257 in accordance with a received RRC common (e.g., radioResourceConfigCommon) message for SCG 1257. The UE 1202 may configure lower layers of the SCG 1257 in accordance with any additional fields that may be included in the received SCG configuration parameters. For example, RACH-ConfigDedicated, which is optionally included in the SCG configuration parameters, may be provided to the MAC 761 entity for the SCG 1257. If the RRC connection reconfiguration message includes a radioResourceConfigDedicated parameter, the UE 1202 may perform a radio resource configuration procedure.

The UE 1202 may perform 1213 a random access procedure to the SeNB 1260b for synchronization towards the target cell (e.g., the PCell-like cell) of the SeNB 1260b. The random access procedure to the SeNB 1260b may be part of the RRC connection reconfiguration procedure. The random access procedure may be performed 1213 by the MAC 761 of the SCG 1257.

In the case of SeNB synchronization success (e.g., random access procedure success), the UE 1202 may send an RRC connection reconfiguration complete (RRCConnectionReconfigurationComplete) message to the MeNB 1260a. After the MAC 761 of the SCG 1257 successfully completes the random access procedure, the UE 1202 may complete the reconfiguration procedure. The UE 1202 may submit an RRC connection reconfiguration complete message to lower layers of the MCG 1255 for transmission to the MeNB 1260a. Information related to the result of the random access procedure may be included in the RRC connection reconfiguration complete message. In this case, information related to the success of the random access procedure may be included in the RRC connection reconfiguration complete message.

In the case of SeNB synchronization failure 1215 (e.g., random access procedure failure), the UE 1202 may send 1217 a RRC connection reconfiguration complete message that includes information related to the failure of the random access procedure. In one configuration, the UE 1202 may start a timer (e.g., timer T1) in the RRC connection reconfiguration procedure. In one example, the timer may be started just before the random access procedure. In another example, the timer may be started upon receipt of the RRC connection reconfiguration message. If the timer expires (e.g., the random access procedure was not successfully completed in time), the UE 1202 may generate a RRC connection reconfiguration complete message that includes information related to random access failure. The UE 1202 may send 1217 the RRC connection reconfiguration complete message that includes information related to random access failure to the MeNB 1260a. The MeNB 1260a may send 1219 a random access failure indication to the SeNB 1260b.

Several implementations for information related to the result of the random access procedure may be utilized. For example, if the random access failure occurs in the SCG 1257, an indication of the random access failure on the SCG 1257 may be included in the RRC connection reconfiguration complete message. If the random access procedure in the SCG 1257 is successfully completed, indication of the random access procedure success on the SCG 1257 may be included in the RRC connection reconfiguration complete message.

The information related to the result of the random access procedure may be referred to as an SCG configuration or reconfiguration (e.g., (re)configuration) complete message. For example, if the random access procedure in the SCG 1257 is successfully completed, the SCG (re)configuration complete message may be included in the RRC connection reconfiguration complete message. If random access failure occurs in the SCG 1257, the SCG (re)configuration complete message may not be included. In another implementation, if random access failure occurs in the SCG 1257, the SCG (re)configuration failure message may be included in the RRC connection reconfiguration complete message.

If random access failure occurs in the SCG 1257, the UE 1202 may revert back to previous configurations. In one example, reverting back to the previous configurations may mean returning the MCG 1255 and the SCG 1257 configurations to the state of the MCG 1255 and the SCG 1257 configurations before receipt of the RRC connection reconfiguration message. In another example, reverting back to the previous configurations may mean returning the SCG 1257 configuration to the state of the SCG 1257 configuration before receipt of the RRC connection reconfiguration message and keeping MCG 1255 configuration applied by the RRC connection reconfiguration message.

Alternatively, the DRB 1275 configuration may be applied after the random access success (i.e. synchronization with the SeNB 1260*b*). In other words, physical layer and MAC layer related (re)configurations may be first applied before the random access procedure to the SCG 1257. And then, remaining (re)configurations may be applied after the random access procedure is successfully completed. This can achieve less involvement of DRB reconfiguration in random access problem. Upon receiving the RRC connection reconfiguration message, the UE 1202 may start to apply the new configuration. The UE 1202 may start synchronizing to the DL of the target cell of the SCG 1257. The target cell of the SCG 1257 may also be referred to as the PCell-like cell, primary SCell (PSCell), secondary PCell (SPCell), PCellscg, SCG PCell, etc. The UE 1202 may establish a MAC 761 entity of the SCG 1257. The UE 1202 may apply the value of the newUE-Identity as the cell-radio network temporary identifier (C-RNTI) for the SCG 1257.

The UE 1202 may configure lower layers of the SCG 1257 in accordance with a received RRC common (e.g., radioResourceConfigCommon) message for SCG 1257. The UE 1202 may configure lower layers of the SCG 1257 in accordance with any additional fields that may be included in the received SCG configuration parameters. For example, RACH-ConfigDedicated, which is optionally included in the SCG configuration parameters, may be provided to the MAC 761 entity for the SCG 1257. If the RRC connection reconfiguration message includes a radioResourceConfigDedicated parameter, the UE 1202 may perform a radio resource configuration procedure.

The UE 1202 may perform 1213 a random access procedure to the SeNB 1260*b* for synchronization towards the target cell (e.g., the PCell-like cell) of the SeNB 1260*b*. The random access procedure to the SeNB 1260*b* may be part of the RRC connection reconfiguration procedure. The random access procedure may be performed 1213 by the MAC 761 of the SCG 1257.

In the case of SeNB synchronization success (e.g., random access procedure success), the UE 1202 may apply the DRB 1275 configuration if DRB configuration for the MCG 1255 and/or the SCG 1257 is included in the RRC connection reconfiguration message. The DRB 1275 configuration includes parameters for remapping a DRB 1275 that is established on the MCG 1255 to the SCG 1257.

The UE 1202 may submit an RRC connection reconfiguration complete message to lower layers of the MCG 1255 for transmission to the MeNB 1260*a*. Information related to the result of the random access procedure may be included in the RRC connection reconfiguration complete message. In this case, information related to the success of the random access procedure may be included in the RRC connection reconfiguration complete message.

In the case of SeNB synchronization failure 1215 (e.g., random access procedure failure), the UE 1202 may send 1217 a RRC connection reconfiguration complete message that includes information related to the failure of the random access procedure as explained above.

In above alternative, the UE 1202 may revert back to previous configurations, but in this alternative, the UE 1202 has not applied the DRB configuration. Therefore, by applying the DRB 1275 configuration after the random access success, the procedure may be efficiently simplified.

Figure 13:
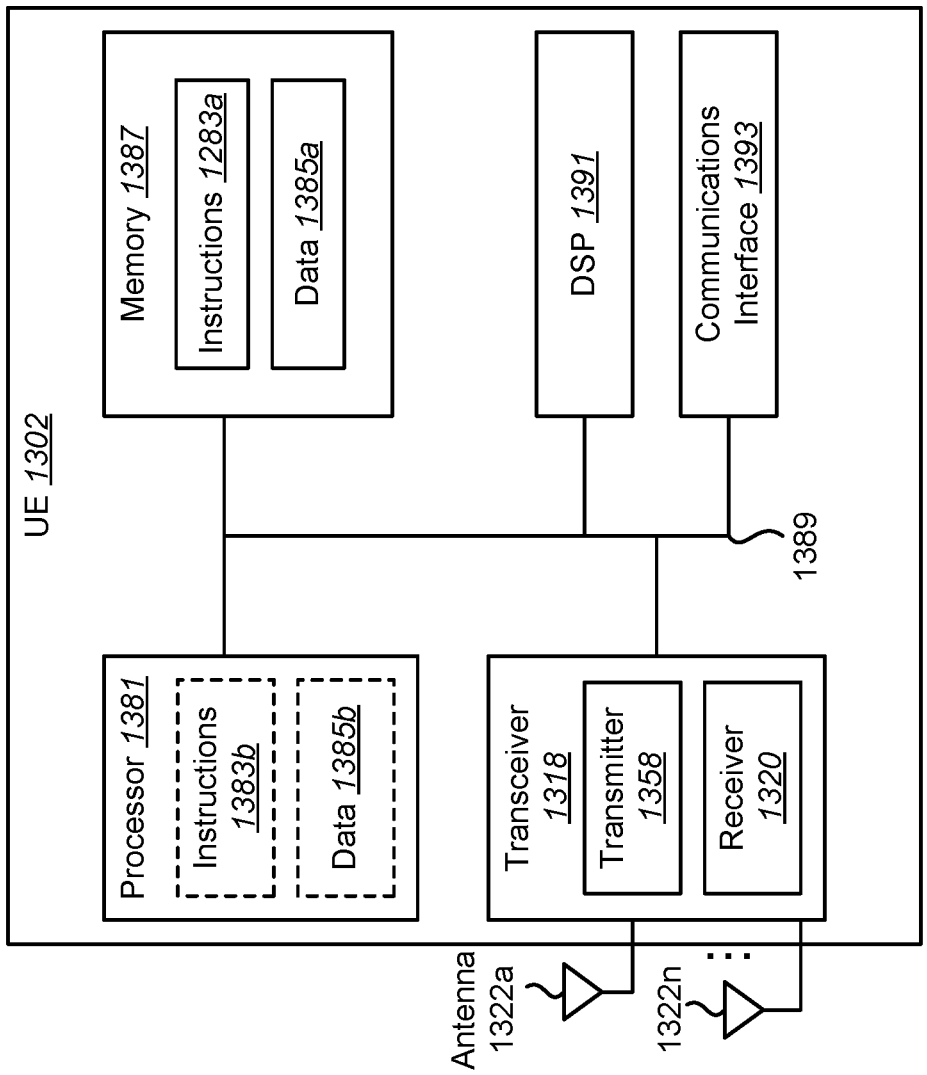
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1381 that controls operation of the UE 1302. The processor 1381 may also be referred to as a central processing unit (CPU). Memory 1387, which may include read-only memory (ROM), random access memory (RAM), a combination of the two or any type of device that may store information, provides instructions 1383*a* and data 1385*a* to the processor 1381. A portion of the memory 1387 may also include non-volatile random access memory (NVRAM). Instructions 1383*b* and data 1385*b* may also reside in the processor 1381. Instructions 1383*b* and/or data 1385*b* loaded into the processor 1381 may also include instructions 1383*a* and/or data 1385*a* from memory 1387 that were loaded for execution or processing by the processor 1381. The instructions 1383*b* may be executed by the processor 1381 to implement one or more of the methods 200 and 400 described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322*a-n* are attached to the housing and electrically coupled to the transceiver 1318.

The various components of the UE 1302 are coupled together by a bus system 1389, which may include a power bus, a control signal bus and a status signal bus, in addition to a data bus. However, for the sake of clarity, the various buses are illustrated in FIG. 13 as the bus system 1389. The UE 1302 may also include a digital signal processor (DSP) 1391 for use in processing signals. The UE 1302 may also include a communications interface 1393 that provides user access to the functions of the UE 1302. The UE 1302 illustrated in FIG. 13 is a functional block diagram rather than a listing of specific components.

Figure 14:
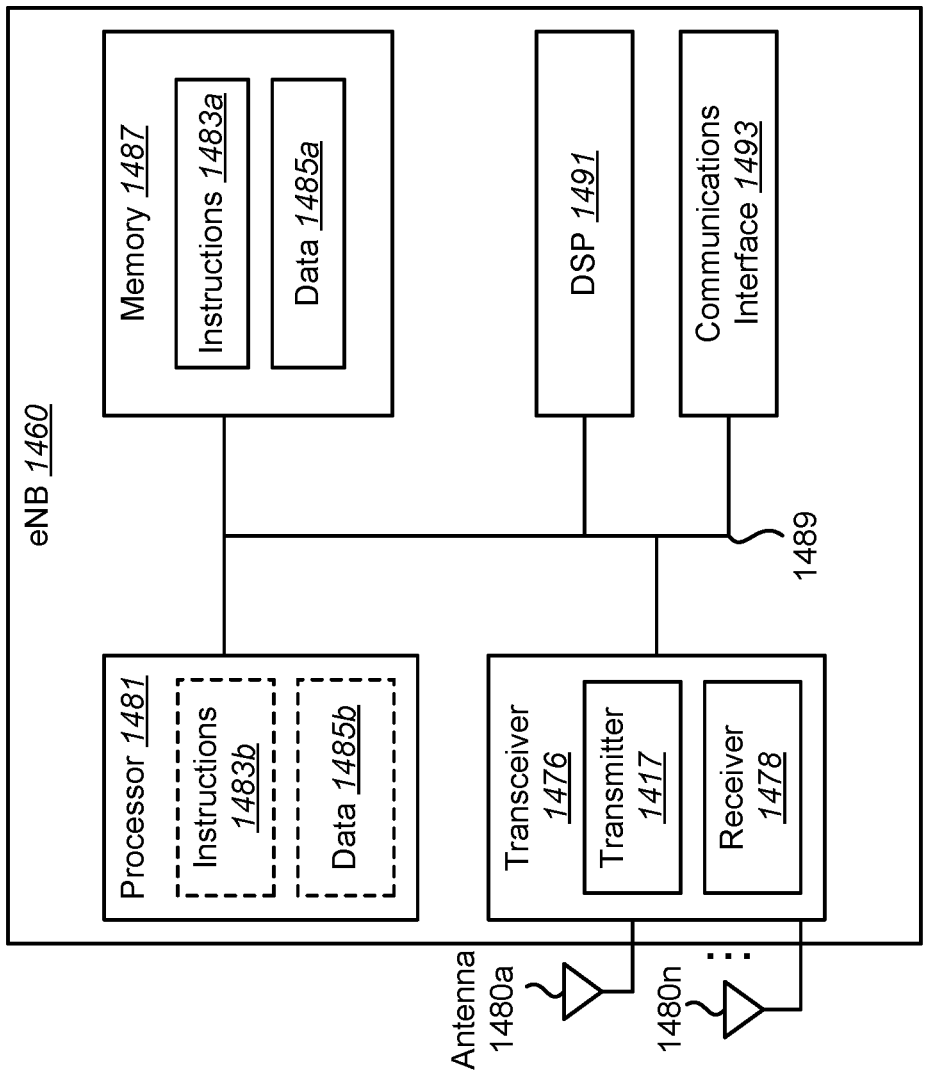
FIG. 14 illustrates various components that may be utilized in an eNB.

FIG. 14 illustrates various components that may be utilized in an eNB 1460. The eNB 1460 described in connection with FIG. 14 may be implemented in accordance with the eNB 160 described in connection with FIG. 1. The eNB 1460 includes a processor 1481 that controls operation of the eNB 1460. The processor 1481 may also be referred to as a central processing unit (CPU). Memory 1487, which may include read-only memory (ROM), random access memory (RAM), a combination of the two or any type of device that may store information, provides instructions 1483a and data 1485a to the processor 1481. A portion of the memory 1487 may also include non-volatile random access memory (NVRAM). Instructions 1483b and data 1485b may also reside in the processor 1481. Instructions 1483b and/or data 1485b loaded into the processor 1481 may also include instructions 1483a and/or data 1485a from memory 1487 that were loaded for execution or processing by the processor 1481. The instructions 1483b may be executed by the processor 1481 to implement one or more of the methods 300 and 500 described above.

The eNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the eNB 1460 are coupled together by a bus system 1489, which may include a power bus, a control signal bus and a status signal bus, in addition to a data bus. However, for the sake of clarity, the various buses are illustrated in FIG. 14 as the bus system 1489. The eNB 1460 may also include a digital signal processor (DSP) 1491 for use in processing signals. The eNB 1460 may also include a communications interface 1493 that provides user access to the functions of the eNB 1460. The eNB 1460 illustrated in FIG. 14 is a functional block diagram rather than a listing of specific components.

Figure 15:
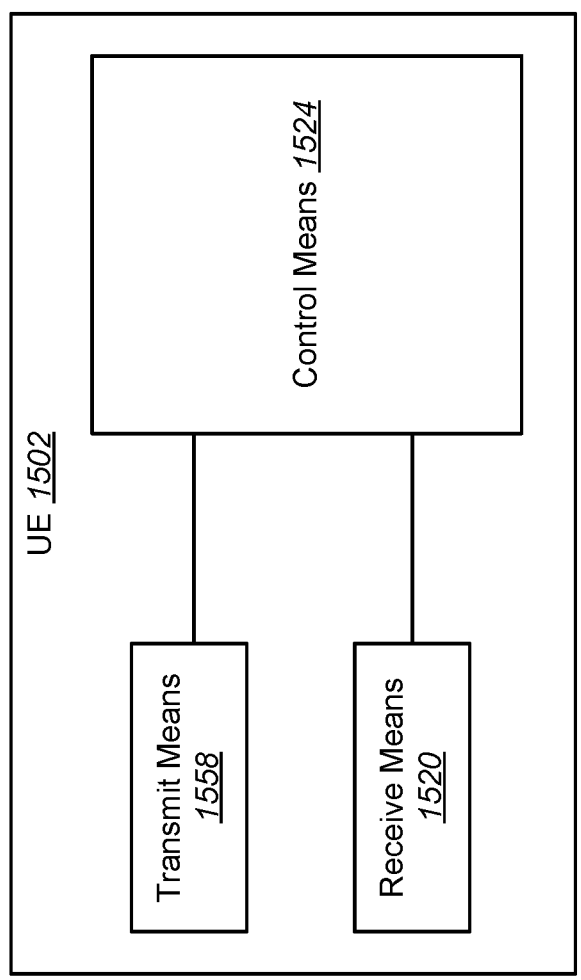
FIG. 15 is a block diagram illustrating one configuration of a UE in which systems and methods for sending feedback information may be implemented.

FIG. 15 is a block diagram illustrating one configuration of a UE 1502 in which systems and methods for sending feedback information may be implemented. The UE 1502 includes transmit means 1558, receive means 1520 and control means 1524. The transmit means 1558, receive means 1520 and control means 1524 may be configured to perform one or more of the functions described in connection with FIG. 2 and FIG. 4 above. FIG. 13 above illustrates one example of a concrete apparatus structure of FIG. 15. Other various structures may be implemented to realize one or more of the functions of FIG. 2 and FIG. 4. For example, a DSP may be realized by software.

Figure 16:
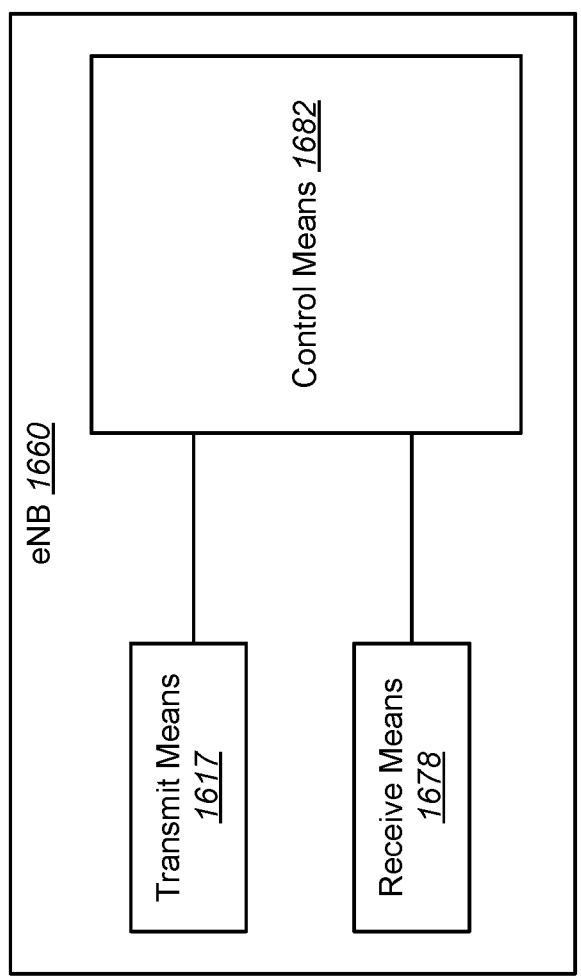
FIG. 16 is a block diagram illustrating one configuration of an eNB in which systems and methods for receiving feedback information may be implemented.

FIG. 16 is a block diagram illustrating one configuration of an eNB 1660 in which systems and methods for receiving feedback information may be implemented. The eNB 1660 includes transmit means 1617, receive means 1678 and control means 1682. The transmit means 1617, receive means 1678 and control means 1682 may be configured to perform one or more of the functions described in connection with FIG. 3 and FIG. 5 above. FIG. 14 above illustrates one example of a concrete apparatus structure of FIG. 16. Other various structures may be implemented to realize one or more of the functions of FIG. 3 and FIG. 5. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A user equipment (UE) for receiving a radio resource control (RRC) message, comprising:
   a processor; and
   memory in electronic communication with the processor, wherein instructions stored in the memory are executable to:
   receive, from a base station, an RRC connection reconfiguration message including secondary cell group (SCG) configuration parameters for SCG configuration applied to a SCG, wherein the SCG configuration parameters include a radio link control (RLC) configuration,
   wherein an RLC entity in the UE is established for the SCG according to the SCG configuration parameters including the RLC configuration, a first Medium Access Control (MAC) entity in the UE is mapped to a master cell group (MCG), and a second MAC entity in the UE is mapped to the SCG,
   the MCG comprises a primary cell and no, one or more secondary cell(s) and the SCG comprises a specific cell and no, one or more secondary cell(s), and
   a random access procedure is performed by the UE on the specific cell upon an addition of SCG and the specific cell is different from the secondary cell.

2. A base station for transmitting a radio resource control (RRC) message, comprising:
   a processor; and
   memory in electronic communication with the processor, wherein instructions stored in the memory are executable to:
   transmit, to a user equipment (UE), an RRC connection reconfiguration message including secondary cell group (SCG) configuration parameters for SCG configuration applied to a SCG, wherein the SCG configuration parameters include a radio link control (RLC) configuration,
   wherein an RLC entity in the UE is established for the SCG according to the SCG configuration parameters including the RLC configuration, a first Medium Access Control (MAC) entity in the UE is mapped to a master cell group (MCG), and a second MAC entity in the UE is mapped to the SCG, the MCG comprises a primary cell and no, one or more secondary cell(s) and the SCG comprises a specific cell and no, one or more secondary cell(s), and a random access procedure is performed by the UE on the specific cell upon an addition of SCG and the specific cell is different from the secondary cell.

3. A method by a user equipment (UE) for receiving a radio resource control (RRC) message, comprising:

receiving, from a base station, an RRC connection reconfiguration message including secondary cell group (SCG) configuration parameters for SCG configuration applied to a SCG, wherein the SCG configuration parameters include a radio link control (RLC) configuration, wherein an RLC entity in the UE is established for the SCG according to the SCG configuration parameters including the RLC configuration, a first Medium Access Control (MAC) entity in the UE is mapped to a master cell group (MCG), and a second MAC entity in the UE is mapped to the SCG, the MCG comprises a primary cell and no, one or more secondary cell(s) and the SCG comprises a specific cell and no, one or more secondary cell(s), and a random access procedure is performed by the UE on the specific cell upon an addition of SCG and the specific cell is different from the secondary cell.

4. A method by a base station for transmitting a radio resource control (RRC) message, comprising:

transmitting, to a user equipment (UE), an RRC connection reconfiguration message including secondary cell group (SCG) configuration parameters for SCG configuration applied to a SCG, wherein the SCG configuration parameters include a radio link control (RLC) configuration, wherein an RLC entity in the UE is established for the SCG according to the SCG configuration parameters including the RLC configuration, a first Medium Access Control (MAC) entity in the UE is mapped to a master cell group (MCG), and a second MAC entity in the UE is mapped to the SCG, the MCG comprises a primary cell and no, one or more secondary cell(s) and the SCG comprises a specific cell and no, one or more secondary cell(s), and a random access procedure is performed by the UE on the specific cell upon an addition of SCG and the specific cell is different from the secondary cell.

* * * * *